United States Patent [19]

Gruner

[11] 4,089,052

[45] May 9, 1978

[54] DATA PROCESSING SYSTEM

[75] Inventor: Ronald Hans Gruner, Cary, N.C.

[73] Assignee: Data General Corporation, Southboro, Mass.

[21] Appl. No.: 803,639

[22] Filed: Jun. 6, 1977

Related U.S. Application Data

[60] Division of Ser. No. 749,911, Dec. 13, 1976, Pat. No. 4,048,623, which is a continuation of Ser. No. 509,159, Sep. 25, 1974, abandoned.

[51] Int. Cl.² .............................................. G06F 13/00
[52] U.S. Cl. .................................................... 364/200
[58] Field of Search ........................... 364/200, 900; 340/173 R

[56] References Cited

U.S. PATENT DOCUMENTS

| | | | |
|---|---|---|---|
| 3,753,232 | 8/1973 | Sporer | 364/200 |
| 3,821,709 | 6/1974 | Curley | 364/200 |
| 3,974,479 | 8/1976 | Kotok et al. | 364/200 |
| 3,997,875 | 12/1976 | Broeren | 364/200 |

*Primary Examiner*—Mark E. Nusbaum
*Attorney, Agent, or Firm*—Robert F. O'Connell

[57] ABSTRACT

A data processing system having at least one memory module and at least one data accessing control unit, wherein the data accessing control unit provides a first memory control signal for requesting a start of a memory module and a second memory control signal for preventing a start thereof. Each memory module includes means responsive to the first and second memory control signals and to a busy signal generated by the module, for starting the module when the state of the busy signal indicates the module is not currently in operation and the state of the second memory control signal indicates the module is not to be prevented from starting.

2 Claims, 29 Drawing Figures

| NON-INTERLEAVED | J6 | J8 | J10 | J12 | J14 | J16 |
| 2-WAY | J6 | J8 | J11 | J12 | J14 | J17 |
| 4-WAY | J6 | J9 | J11 | J12 | J15 | J17 |
| 8-WAY | J7 | J9 | J11 | J13 | J15 | J17 |

J1, J2, J3, J4 & J5 USED
FOR MODULE SELECTION

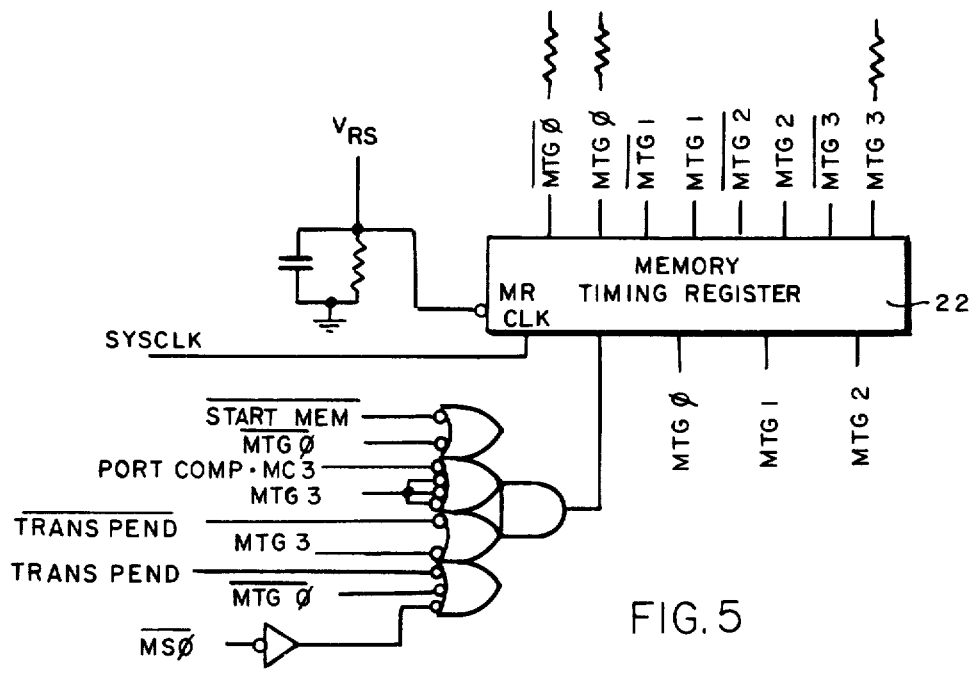
FIG. 5
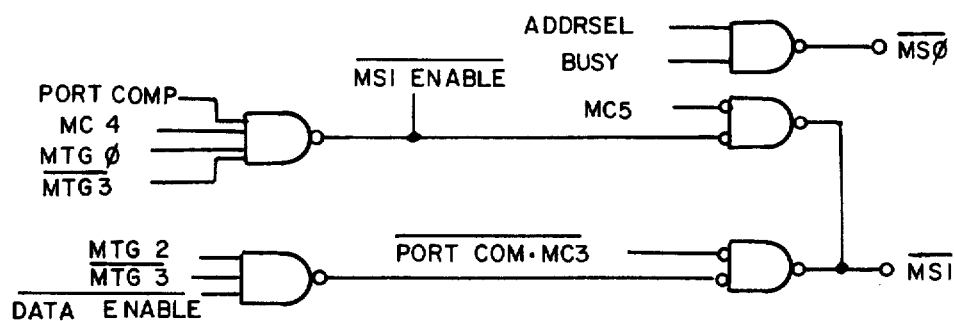
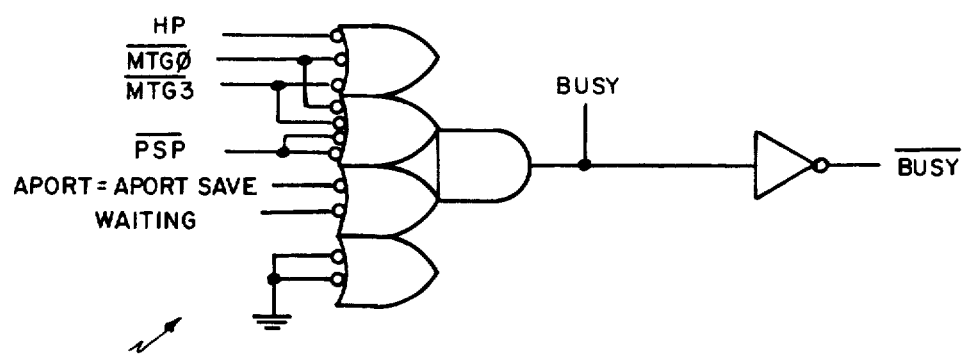
FIG. 7

FIG.13 (CASE 1)

FIG.15 (CASE 3)

FIG. 16 (CASE 4)

FIG.17 (CASE 5)

DATA PROCESSING SYSTEM

This is a division of Application Ser. No. 749,911, now U.S. Pat. No. 4,048,623, filed Dec. 13, 1976, which is in turn a continuation of Ser. No. 509,159, now abandoned, filed Sept. 25, 1974.

INTRODUCTION

This invention relates generally to date processing systems and, more particularly, to high speed data processing systems adapted to utilize a single memory system with either one or a plurality of central processor units wherein appropriate logic is available on each module of such memory system for increasing the overall operating speed of the memory system and further wherein an appropriate multiprocessor control unit is used to provide time-shared control of address and data transfers among multiple processor units and a single memory system.

BACKGROUND OF THE INVENTION

In data processing systems it is conventional to utilize a single central processor unit (CPU) with a single memory system with appropriate conrol logic in the CPU for controlling the transfer of address and data information between such units on suitable buses. In the design thereof it is desirable to arrange the logic control so that a processor is capable of operating with a memory unit even when the cycle time of operation is not the same as the cycle time of operation of the central processor unit, i.e., the CPU and memory timing are not exactly synchronous and the CPU can operate, for example, with memory units having different speeds of operation. Such non-synchronous operation is often most effectively arranged so that the CPU and memory operating time cycles are not completely asynchronous but rather are quasi-synchronous, i.e., there is a defined phase, or time, relation between them. One such system has been described in U.S. Pat. No. 4,014,006, issued to Sorensen et al.

In making the most effective use of such a quasisynchronous system it is desirable that the speed of operation of the overall system be reduced as much as possible by providing for simultaneous operation of more than one memory module so that access to a second module can be obtained not only before the first memory module has completed its rewrite cycle of operation, but even before the first module has completed its data transfer.

Further, since the design and fabrication of memory units is generally relatively more expensive than the design and fabrication of central processor units, one approach to reducing the overall costs of data processing systems is to provide access to a memory sub-system by more than one central processor unit. If a single memory unit is made available to multiple CPUs and appropriate address and data information transfers can be efficiently arranged and controlled at relatively little increase in cost and equipment, the overall effectiveness of operation as a function of cost can be considerably enhanced. Moreover, since only one section of memory is active at a time, utilization of the rest of the memory system can be more fully realized if more than one processor is sharing the system (i.e., more data can be processed per unit time).

DISCUSSION OF THE PRIOR ART

One method that has been suggested for providing at least partially simultaneous operation of more than one memory module has been to interleave the memory words stored in the memory system so that sequential words normally stored sequentially in the same memory module are stored in different memory modules so that a data processing operating sequence can access different modules in sequence. Such interleaved systems as are presently known tend to reduce the overall memory operating time by permitting access to a second memory module during the time when a first memory module is performing its rewrite, or recycling, operation. In applications where even higher overall operating speed is desired, the advantages of such interleaving principle of memory management are not always realized in the most effective manner.

Further, in presently known systems which arrange for the use of a single memory system by a pair, or more, of central processor units, the memory system is usually arranged as a combination of separate, fixed-capacity memory modules and separate address and data buses, or parts, are connected between each central processor unit and each memory module of the memory system which is going to be accessed thereby. The number of additional buses required increases both the complexity and the cost of the system and, while such space sharing techniques are helpful, the overall increase in data processing effectiveness per cost is not maximized.

In other multi-processor data processing systems, a main central processor unit is appropriately connected to a memory system and the system operation logic is specially arranged to provide for a separate external data channel operating state so that another processor unit, external to the system, can be given access to the memory system so that the desired data can be extracted for processing independently of the main central processor unit. In such a system, the external data channel operating state must be specially programmed so that the external processor unit can utilize the memory system only when the latter is available, i.e., only when the main central processor unit does not desire access thereto. The complexity of the required logic, the need for additional interface equipment, and the relatively inefficient use of the system tend to make the overall effectiveness per cost of the system operation relatively low.

SUMMARY OF THE INVENTION

In the data processing system of the invention the operating logic of the system is arranged so that access to a second memory module can be obtained by a central processor unit before a data transfer has been completed with respect to a first memory module and read-out of the second memory module can proceed during the rewrite cycle of the first module. The use of such overlapping of the access, or "fetch," operation of the memory modules reduces the overall processing time and is most effective when it is coupled with the use of interleaving techniques to provide an even greater reduction in processing time than is achieved with presently known interleaved systems. Such operation is advantageous whether the memory system is used for single, or multiple, central processor operation.

Moreover, for multiprocessor operation of the data procesing system of the invention, a plurality of central processor units are arranged to have access to a single quasisynchronous memory system through the utilization of a unique time-sharing technique requiring a single address bus and a single memory/data bus which permits a high efficiency of operation with a relatively low additional cost incurred in the design and fabrication of the necessary control logic therefor. As explained in more detail below, in the time-sharing setup of the invention, if two processor units share the same memory system and do not require simultaneous access to the same memory module, each can operate at its own full operating speed without any degradation of overall system performance. If four processors share access to the same memory unit the processor units can be operated in time-phased pairs, as explained more fully below, so that performance degradation occurs only when two processor units in the same time phase require simultaneous access to the adess bus or to the memory/data bus or when two processor units in different phases require access to the same memory module.

In the case of a multiprocessor system utilizing four central processor units, for example, every transaction, i.e., information transfer, on either the address bus or the memory/data bus is arranged to be performed in a fixed time period which has an integral relationship with the minimum expected time period for an instruction word. For example, where the minimum instruction word time is 200 nanoseconds (nsec.), each bus transaction is arranged to be performed in 100 nsec. The overall instruction word time is, therefore, divided into two phases, one set of the central processor units performing the desired adess and data transfers during one selected phase (i.e., an "A" phase) and the other set of central processor units performing their transactions during the other selected phase (i.e., a "B" phase).

Control of the overall time-sharing operation is provided by the use of a multiprocessor control (MPC) unit operatively connected between the processor units and the memory system. The MPC unit controls the priorities of use of the memory system by the multiple processors in accordance with a preselected priority allocation among the processor units. For example, for a system using four processors, one of the processors is given the highest priority, a second processor is provided with the next highest priority, and the remaining two processors are given effectively equal, and alternating, priorities.

More detailed information for implementing the interleaving and fetch-overlap process of the invention and for implementing the multi-processor control unit in combination with the central processor units and the memory modules of the memory system is provided below, with the assistance of the accompanying drawings wherein FIG. 1 shows a broad block diagram of the system of the invention utilizing a single processor and memory syste,;

FIG. 5 shows still another part of the logic circuitry of FIG. 2;

FIG. 7 shows still another part of the logic circuitry of FIG. 2;

Figure 1:
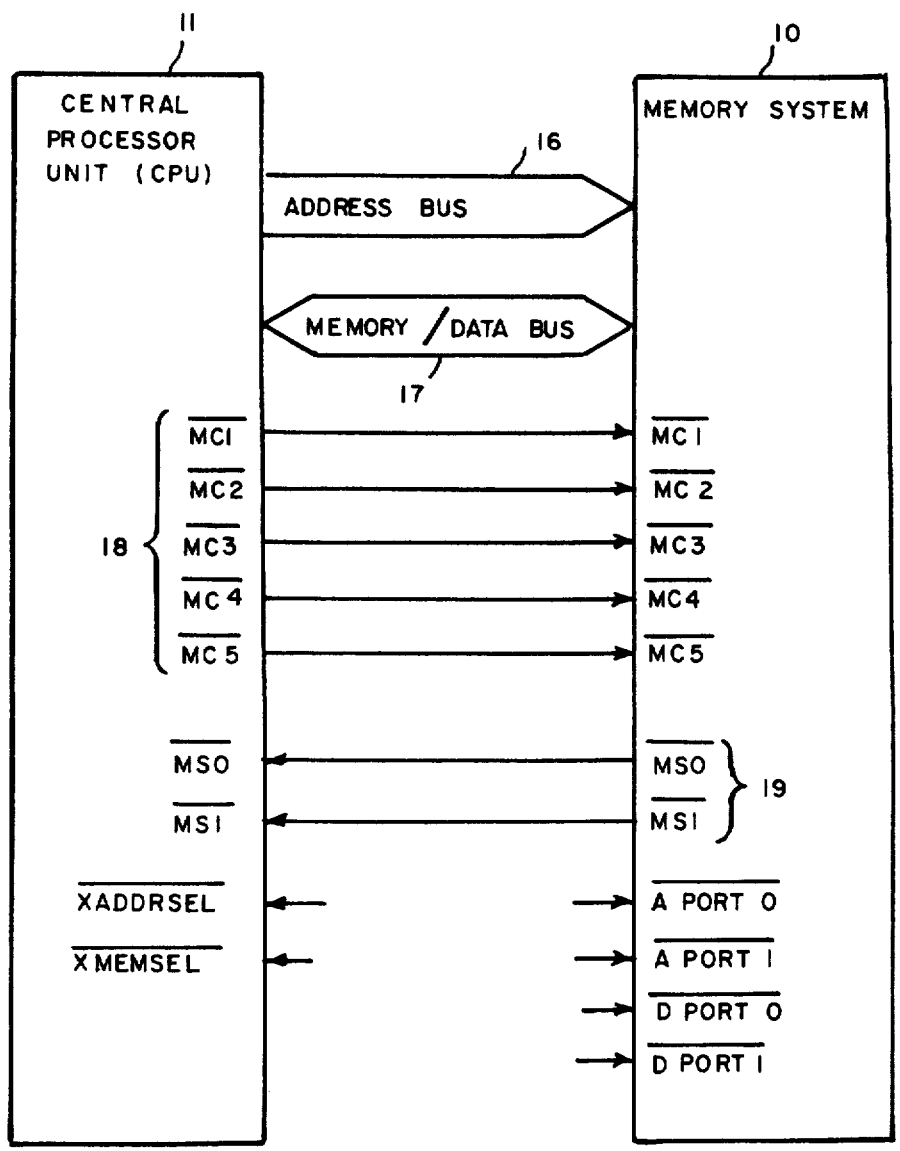

As can be seen in FIG. 1, a single memory system 10, comprising a plurality of separate memory modules, shown and discussed in more detailed drawings below, is arranged so that it can be accessed by a central processor unit 11. The central processor unit 11 has access to an address bus 16 and to a memory/data bus 17 so that appropriate processor address information can be transferred from the processor to a selected memory module and data can be transferred between such processor and the selected memory module. In the embodiment described herein, the address bus is an 18-bit unidirectional bus and the memory/data bus is a 16-bit bidirectional bus. The interface signals between CPU 11 and the memory system 10 include five memory control signals 18, identified as MC1 through MC5 for conveying information concerning address and data requests from the processor to the memory. Two memory status interface signals 19 from the memory system to the CPU provide information concerning the status of the memory module which has been accessed, such signals being identified in FIG. 1 as the $\overline{MS1}$ and $\overline{MS0}$ signals. Additional signals related to address and data port control operation and address and memory select signals are also shown as being available for multiple processor operation with the single memory system 10 but are described later with respect to FIGS. 11-27 and, accordingly, are not discussed at this point with respect to single processor operation.

The overall memory system 10 of FIG. 1 can be divided into relatively small blocks, or memory modules, each typically containing 8K or 16K memory words. Each memory module contains all of the timing and control logic needed for operation independently from each other memory module. For example, in a core memory system, if the processor is reading information from a particular memory module, as in an Instruction Fetch operation, for example, the rewriting of the data back into the addressed location in such module is done automatically by the module itself after the data has been obtained by the processor. The arrangement of the necessary logic in the memory module for providing such a data rewrite operation without tying up the operation of the processor allows the processor to proceed to its next instruction or to process the data which has been retrieved, independently of the core memory system.

Further, the memory system may be arranged to be used in an interleaving process. In non-interleaved memory systems, groups of memory words (e.g., instruction words) which are normally used in sequence are often stored in the same memory module. Accordingly, such sequentially used words cannot be made available simultaneously since access to only one module at a time can be achieved. The process of interleaving memory words reduces the chance that sequentially used memory words will reside in the same memory module and increases the chance that sequential words can be accessed simultaneously. In accordance with such an interleaving memory work arrangement, words which are normally expected to be used sequentially are stored in different memory modules.

In an extremely simplified example for illustrating the interleaving principle, let it be assumed that the memory system comprises two memory modules each storing four memory words. In a non-interleaved system, the eight words which might normally be expected to be used sequentially (i.e., words 0, 1, 2, 3, 4, 5, 6, 7), are stored so that words 0, 1, 2 and 3 are in module #1 and words 4, 5, 6 and 7 are in module #2. In a two-way interleaving arrangement such words can be stored alternately in each module so that words 0, 2, 4 and 6 are stored in module #1 and words 1, 3, 5 and 7 are stored in module 190 2.

Extending the interleaving arrangement to an eight-way interleaving process (i.e., a system using eight memory modules), sequential words may be stored in different modules as shown by the following chart.

|  | MODULES | | | | | | | |
|---|---|---|---|---|---|---|---|---|
|  | #1 | #2 | #3 | #4 | #5 | #6 | #7 | #8 |
| Words | 0 | 1 | 2 | 3 | 4 | 5 | 6 | 7 |
|  | 10 | 11 | 12 | 13 | 14 | 15 | 16 | 17 |
|  | 20 | 21 | 22 | 23 | 24 | 25 | 26 | 27 |
|  | , | , | , | , | , | , | , | , |
|  | , | , | , | , | , | , | , | , |

Normally, without interleaving, the most significant bit or bits (MSB) of an address identify the memory module which is addressed and the remaining bits of the address identify the particular word within a memory module. Thus, in a 64K memory system using eight 8K memory modules, a 16-bit address is required, the first three most significant bits identifying the module which is addressed and the remaining 13 bits identifying one word of the 8K words within such selected module.

If the memory words are interleaved in an eight-way interleaving arrangement, it can be shown that the three least significant bits (LSB) identify the module which is addressed, while the remaining 13 bits identify one word of the 8K words within such module.

In accordance with the structure and operation of the memory modules of the invention, memory access and read operations are arranged to provide reduced overall processing time, whether interleaving is used or not. Thus, the operating logic is arranged to provide for access and read overlap wherein a processor is able to access and begin the read process with respect to a second memory module before data transfer has been completed with respect to a first memory module, as exemplified in the discussion below.

Such operation, when coupled with an arrangement in which the modules are interleaved, provides a most effective overall arrangement. The interleaving technique reduces the chances of requiring simultaneous access to two addresses in the same memory module. The overlap technique takes advantage thereof by permitting access and read operation substantially simultaneously with respect to two different memory modules so that overall processing time is reduced considerably.

For example, if a first module (e.g., Mod 1) is addressed and data therein is to be read, and a second module (e.g., Mod 2) is addressed immediately after the first module and data therein is to be read, both modules can proceed with their read and re-write operations in an overlapping manner as shown below. Each time period shown below is equal to a normal processor operating time cycle (e.g., 200 nanoseconds, as mentioned above).

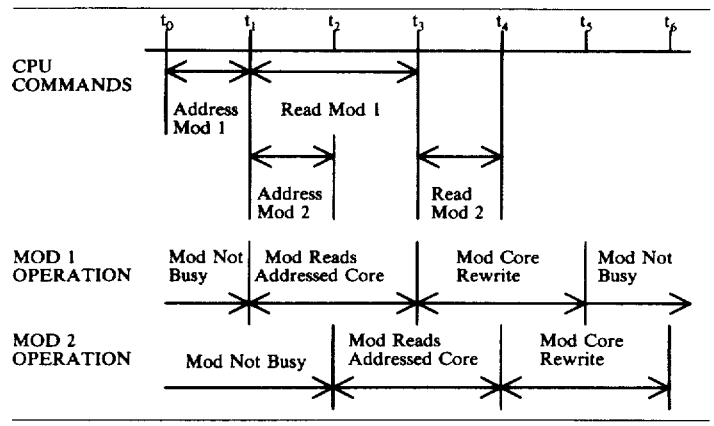

Thus, the overlap operation permits both modules to be accessed and read in only four time periods because the second module was permitted to be accessed and to begin its read operation before data transfer was completed for first module so long as two different modules were involved, the latter condition made more probable by the use of interleaving technique.

Thus, for example, by the use of interleaving, the time required to read or write four consecutive word locations is considerably reduced over the time required in non-interleaved systems wherein, for example, if the time required to read four consecutive word locations in a non-interleaved memory system which uses overlap techniques is 3.2 microseconds, a two-way interleaved process for such a system requires only 1.2 microseconds and a four-way interleaved process requires only 1.2 microseconds. The write time is similarly reduced from 3.2 microseconds in a non-interleaved system to 1.6 microseconds and 0.8 microseconds for two-way and four-way interleaving, respectively.

As mentioned above, the memory system utilized in the invention is quasi-synchronous and each memory module is responsible for synchronizing data transfers to or from a memory module by the use of the two memory status lines as shown in FIG. 1 which lines carry memory status signals MS0 and MS1. If the processor requests access to a particular memory module and such module is in a "busy" state because of a previous request for a data transfer, the memory module will assert the MS0 signal to notify the processor of its "busy" status. When the module ultimately is free to service the processor, the MS0 signal is no longer asserted. If the processor wishes to read information from a previously started memory module and the data is not ready for a "read" operation and the subsequent transfer on the memory bus, the module asserts the MS1 signal to notify the processor that it must wait for validation of the data. When the module is ultimately ready for transfer, the MS1 signal is no longer asserted and the data is available for transfer on to the memory bus.

If the processor wishes to write data into a previously started memory module which it has selected, the module will accept the write data immediately (i.e., the MS1 signal is not asserted) and it will prevent the stored data from being placed in the I/O data buffer, and will write the new data into the addressed location.

Control of the memory module by the processor is accomplished by the use of appropriate logic for generating the memory control signals MC1–MC5. Such signals and the uses thereof are described in more detail below. The logic for the generation thereof need not be described in detail here as the generation of such signals for any specific processor system would be obvious to those in the art. An example of such logic can be found in U.S. Patent No. 3,990,052 and 4,042,942.

As can be seen with reference to FIG. 1, the assertion of an MC1 signal will initiate a start in a selected memory module if that module is currently not in a "busy" state. When the MC1 signal is asserted, the memory address location is always present on the 18-bit physical address bus 16 and each memory module examines the memory address and the appropriate module is, accordingly, selected.

The MC2 signal is asserted when it is desired that any selected module not be started and such a signal can only be present when the MC1 signal is asserted. Thus, if a memory module is currently not "busy" and the MC1 signal is present for selecting such module, the assertion of the MC2 signal prevents the start of that selected module and the particular memory module remains in its "not busy" state.

The MC3 and MC4 signals are asserted in combination and are appropriately coded as discussed below with respect to the analogous signals associated with each of the processors so that a READ ONLY (with no "rewrite" operation), a WRITE ONLY, or a READ (with a "rewrite" operation) occurs.

Thus, the MC3 and MC4 signals identify the type of data transfer which the processor desires to perform with reference to a selected memory module, once the processor has successfully started the memory cycle process. The coding of such signals is set forth in the table below. As shown therein, the designations T (for "True") and F (for "False") are used to indicate when such signals are asserted or not asserted, respectively.

| MC3 | MC4 | Operation | |
|-----|-----|-----------|---|
| F | F | NULL, | i.e., no transaction is to be performed |
| F | T | READ ONLY, | i.e., the selected memory is to be read but the memory cycle is not yet completed |
| T | F | WRITE, | i.e., a Write signal is applied to the selected memory and the memory cycle is completed |
| T | T | READ, | i.e., the selected memory is to be read and the memory cycle is completed |

In connection with the above code, if a READ-MODIFY-WRITE operation is desired to be performed, the coded signals would first indicate a READ ONLY operation, which is thereafter followed by a WRITE operation. Either or both of the $\overline{MC3}$ and $\overline{MC4}$ signals are held asserted so long as the $\overline{MS0}$ or $\overline{MS1}$ signal is asserted.

Assertion of the $\overline{MC5}$ signal indicates that a processor wishes to inhibit the current data transfer portion of the memory cycle and, therefore, such signal inhibits the use of the memory/data bus by the memory module so as to leave such bus available.

Figure 2:
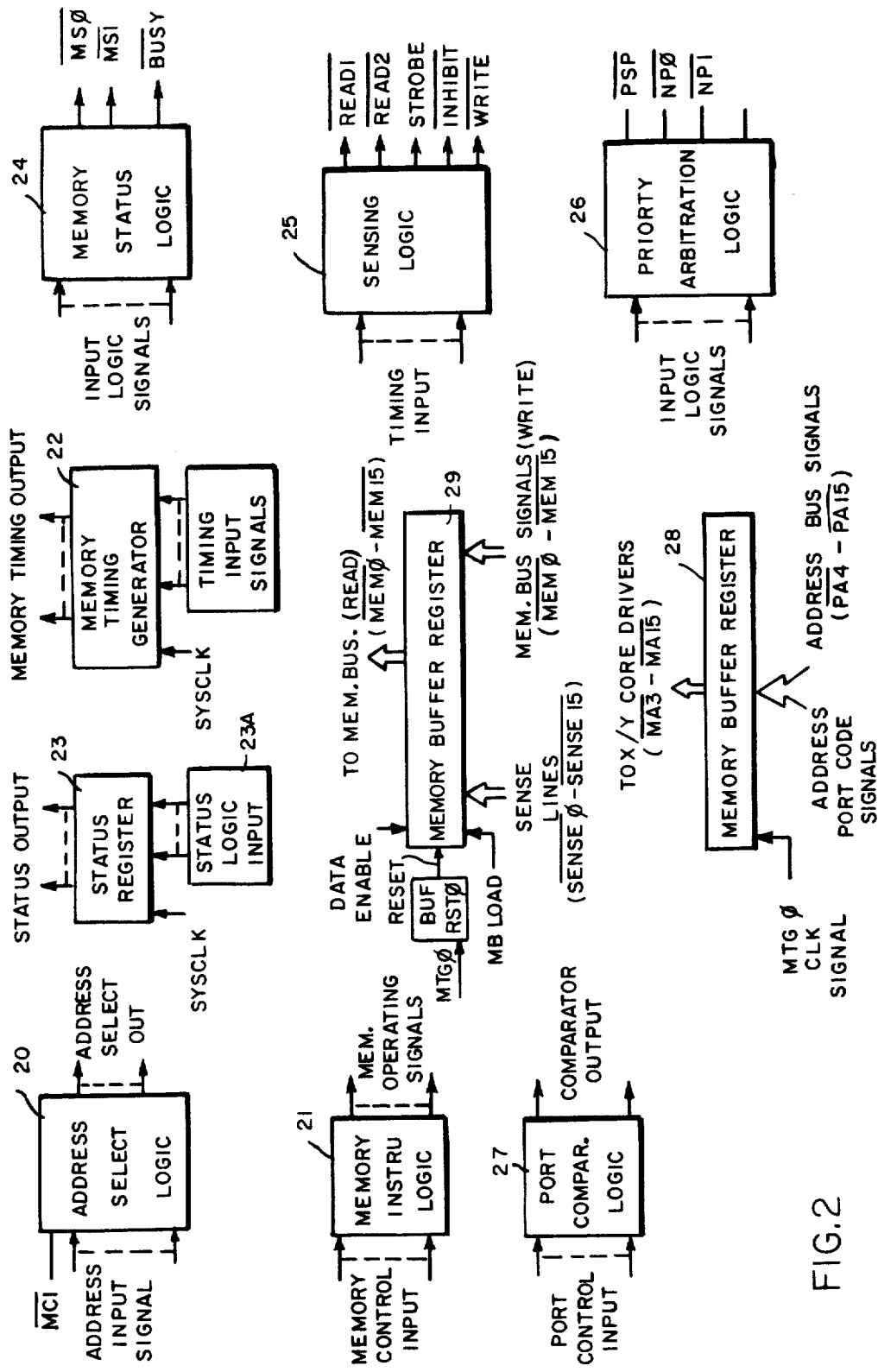
FIG. 2 shows a block diagram of a typical memory module of the memory system of the invention.

A typical memory module for use with a single processor or with multiple processors is shown in FIG. 2. Initially this discussion thereof relates to the use of a single processor with the memory system, and a description of the portions of the memory module which relate to multiple processor operation is provided later. While FIG. 2 shows an overall memory module arrangement in relatively broad block diagram form, specific logic for performing the functions generally discussed below are shown in FIGS. 3-10. As can be seen in FIG. 2, the address select logic 20 accepts the $\overline{MC1}$ and appropriate address input signals from the processor, which latter signals identify the particular memory module to which access is desired, as shown more specifically in FIG. 3. The memory module that is selected then provides an internal address select signal which is supplied to the memory instruction logic 21 to start the memory module operation.

Figure 4:
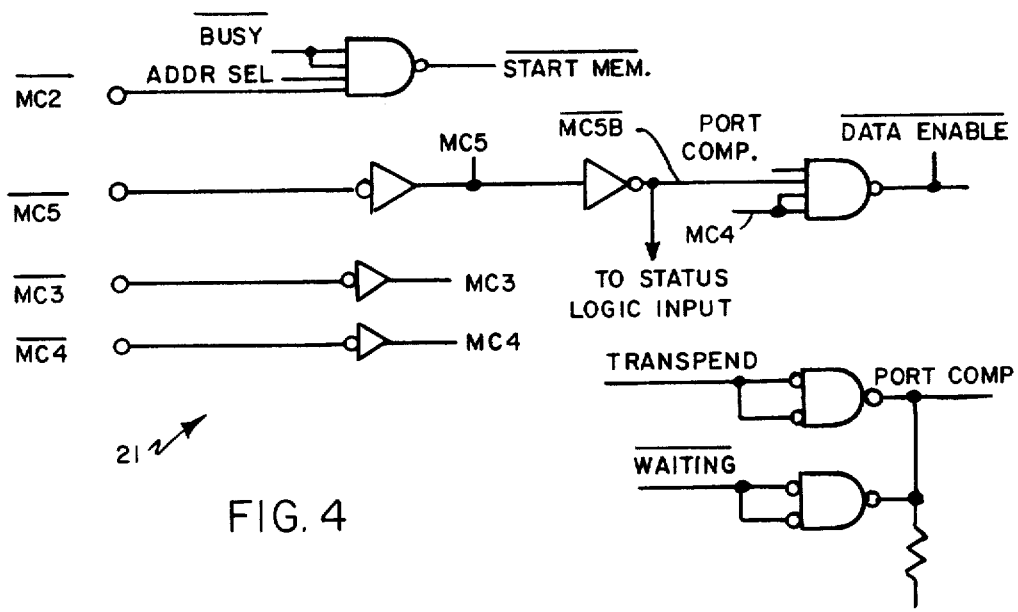
FIG. 4 shows another part of the logic circuitry of FIG. 2.
Figure 10:
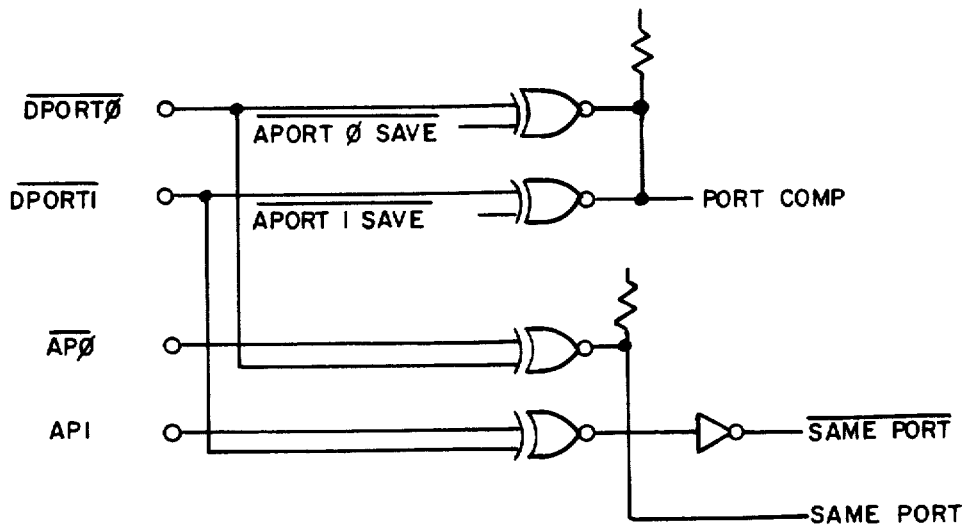
FIG. 10 shows still another part of the logic circuitry of FIG. 2.

The latter logic accepts the internal address select signal, as well as the memory control signals $\overline{MC2}$, $\overline{MC3}$, $\overline{MC4}$ and $\overline{MC5}$ to provide appropriate internal signals for controlling the memory module operation for starting the memory module operation, for read and write operations, or for preventing the memory module from starting or from performing a data transfer, as shown more specifically in FIG. 4.

The memory operating cycle is timed by memory timing generator 22 which is in the form of a conventional Gray code timer which has a predetermined time relationship with reference to a system clock signal (SYS CLK) and which provides appropriate timing pulses internal to the memory module as required for memory operation, as shown more specifically in FIG. 5. The memory status register 23 provides appropriate signals for indicating whether there is a transfer of data pending with respect to the module, whether the memory module is waiting for a data transfer to be performed by another memory module, or whether the memory module is in the proper timing state to accept data for writing into the memory module. Such status output signals are responsive generally to the memory operating signals and the memory timing output signals as well as the memory status output signal $\overline{MS1}$ via status input logic 23A, as shown more specifically in FIG. 6.

The latter signal is generated by memory status logic 24 which provides both the $\overline{MS0}$ and $\overline{MS1}$ signals in response to appropriate memory operating and timing signals and also provides a signal indicating the BUSY status of the memory, as shown more specifically in FIG. 7.

Figure 8:
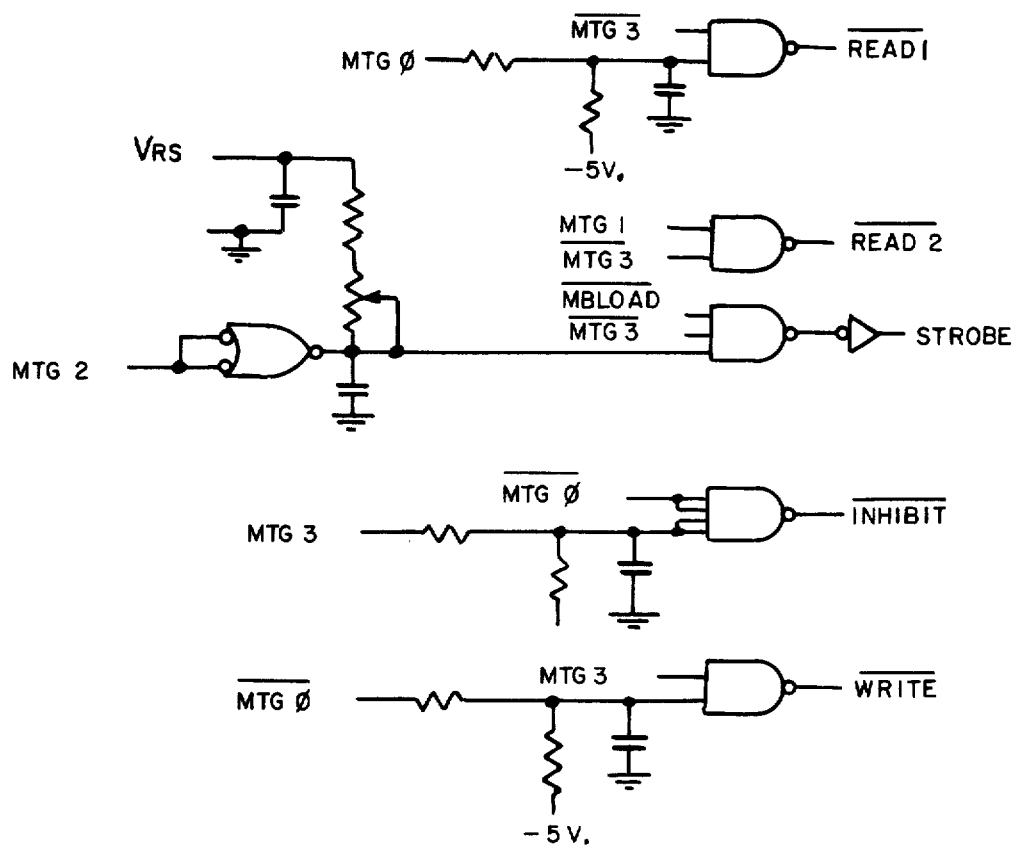
FIG. 8 shows still another part of the logic circuitry of FIG. 2.
Figure 9:
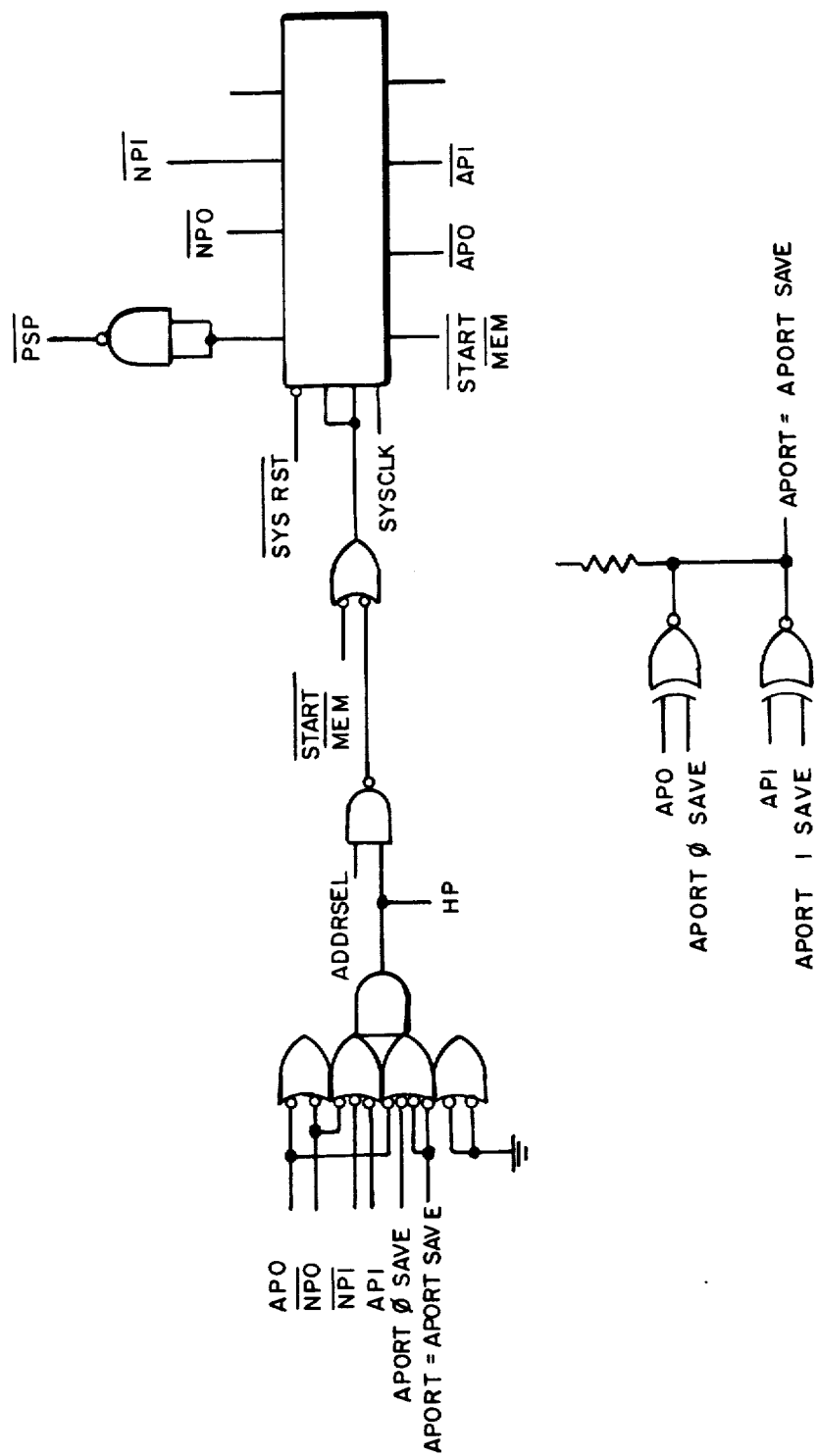
FIG. 9 shows still another part of the logic circuitry of FIG. 2.

The sensing logic 25 is responsive to the memory timing output signals to produce the conventional read, write, strobe and inhibit signals for core memory operation, as shown more specifically in FIG. 8. The priority arbitration logic 26 and port comparison logic 27 are discussed later with reference to multiple processor operation, and are shown more specifically in FIGS. 9 and 10, respectively.

The memory buffer registers 28 and 29 are of generally well-known configuration, register 28 being the address register which accepts the address signals and provides the memory address for the specific X/Y core devices and register 29 being the memory data register for providing read data for transfer from the memory module onto the memory/data bus or for providing write data for transfer from the memory/data bus into the memory module. The structure and operation thereof is well-known to those in the art and is not described in further detail in the figures.

Figures 3, 3A:
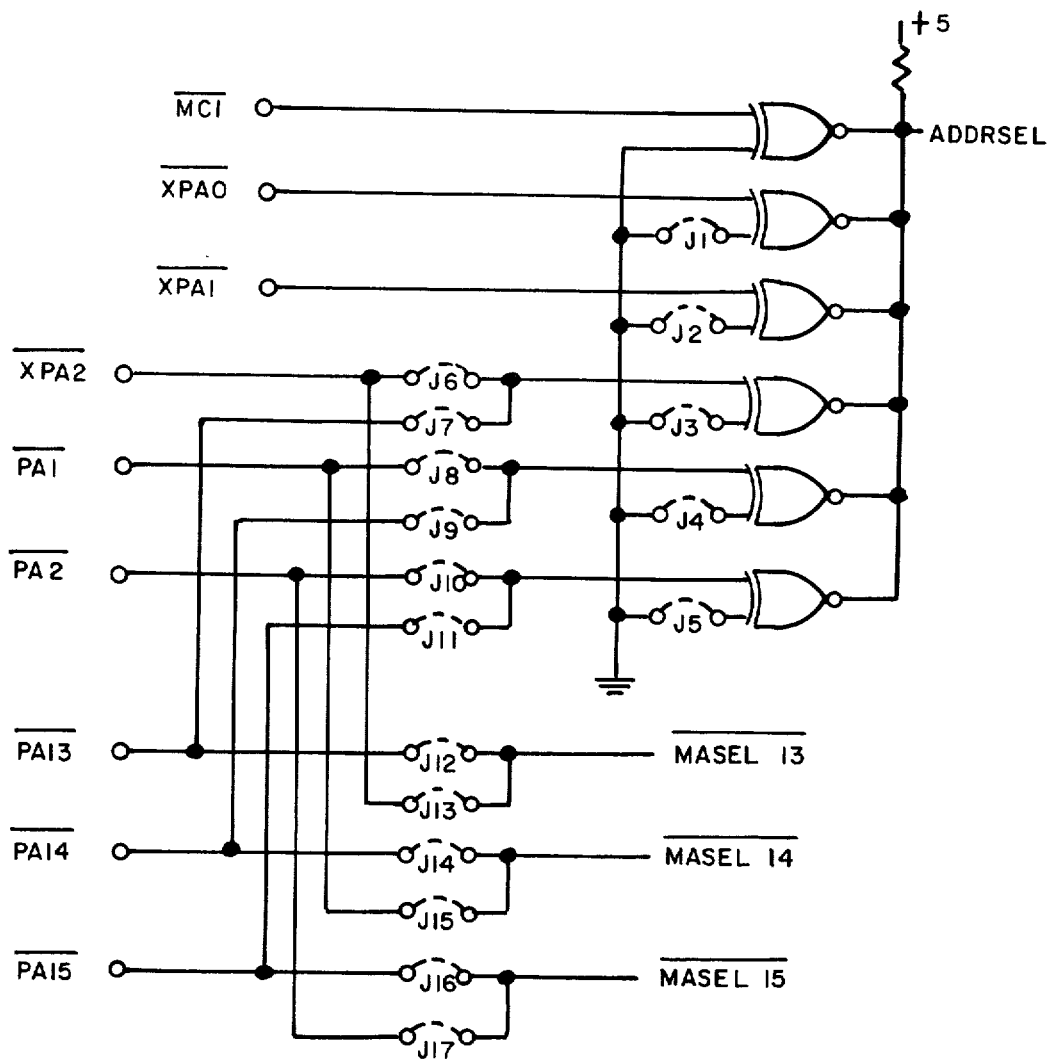
FIG. 3 shows part of the logic circuitry used in the memory module of FIG. 2.
FIG. 3A shows a chart depicting alternative connection for the logic circuitry of FIG. 3.

As can be seen in FIG. 3, the address bits $\overline{XPA2}$, $\overline{PA1}$ and $\overline{PA2}$ represent the three most significant address bits of the 16-bit address signal (comprising bits $\overline{XPA2}$ and $\overline{PA1}$ through $\overline{PA15}$) which can be used to identify which of eight 8K memory modules is being addressed in an eight-module (64K) non-interleaved memory system. Alternatively, the three least significant bits $\overline{PA13}$, $\overline{PA14}$ and $\overline{PA15}$ can be used to identify which of eight modules is being addressed in an eight-way interleaved system, as discussed above. Various combinations of two-way and four-way and eight-way interleaving for a memory system using 8K modules can be arranged in accordance with the connections shown in the chart of FIG. 3A. Moreover, additional address bits $\overline{XPA0}$ and $\overline{XPA1}$ can be used to extend the memory capacity up to a 256K memory system, using 32 8K memory modules, for example. In the latter case, five bits are required to identify the addressed module, the address comprising 18 bits. In any event, when an address in a particular memory module is selected, the ADDRSEL signal is generated by logic 20 together with the three memory address select bits ($\overline{MASEL}$ 13, $\overline{MASEL}$ 14 and $\overline{MASEL}$ 15) representing the last three bits of the core address, which bits may be either the most significant bits, the least significant bits, or a combination thereof in the address depending on whether the system is interleaved or not.

FIG. 4 shows specific logic for providing a $\overline{START}$ $\overline{MEM}$ signal when an $\overline{ADDRSEL}$ is present and no $\overline{BUSY}$ or $\overline{MC2}$ are available to prevent such start. The DATA ENABLE signal is provided for enabling the memory data buffer register 29 provided the $\overline{MC5}$ signal does not signify that a data transfer inhibit is required, and further provided the PORT COMP signal does not indicate that the module must await the data transfer of another module ($\overline{WAITING}$) and does not indicate that a data transfer is pending (TRANSPEND).

FIG. 5 shows the Gray code timing generator for generating the four timing pulses (MTG0, MTG1, MTG2, MTG3) required for Gray code timing operation, in accordance with well-known principles. The memory timing pulses have predetermined time relationships with the timing pulses of the central processor unit which is controlled in accordance with the system clock (SYS CLK) signal supplied to the clock input of the timing register 29.

Figure 6:
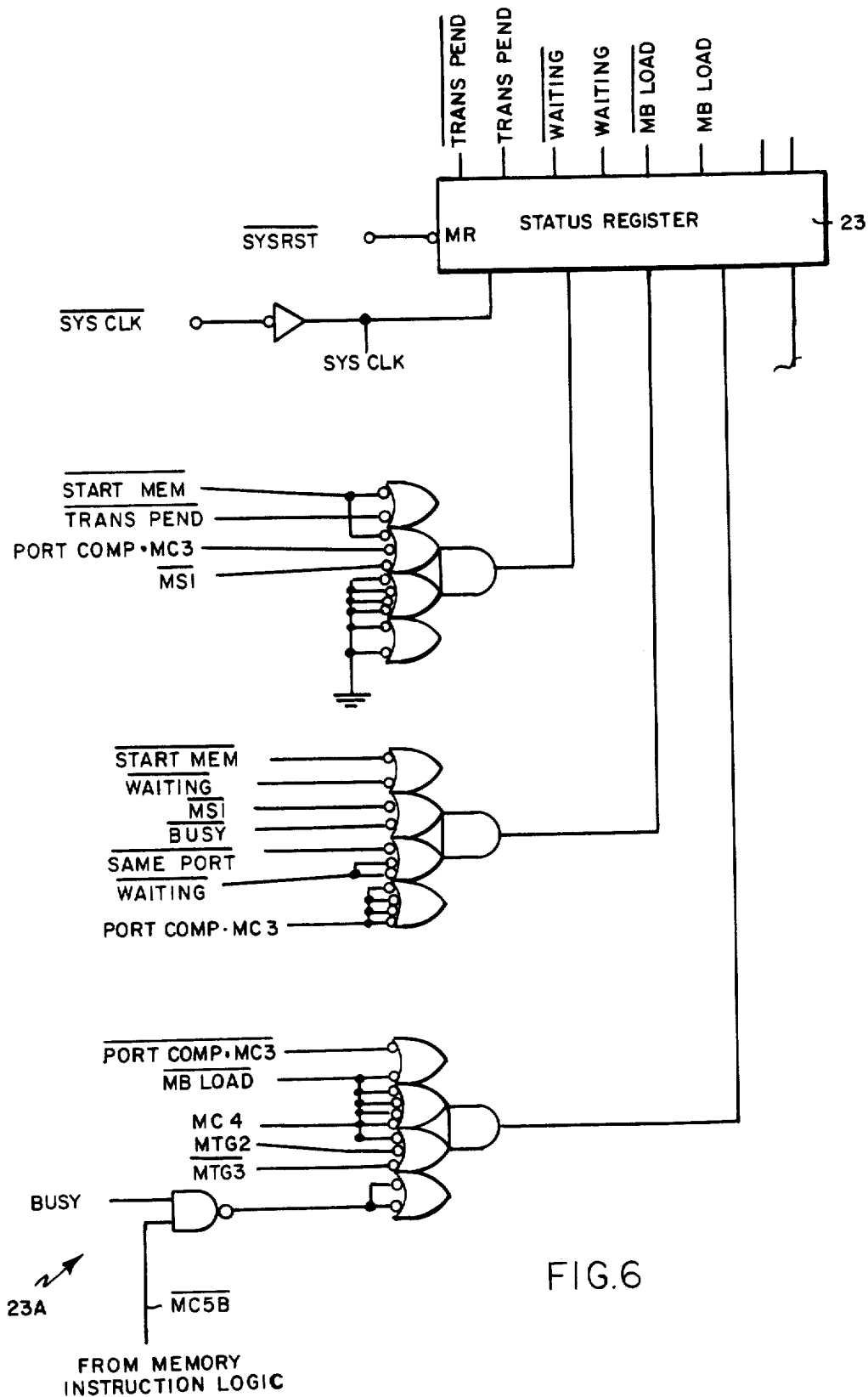
FIG. 6 shows still another part of the logic circuitry of FIG. 2.

FIG. 6 shows the status logic input 23A which provides the input signals to register 23 which, like the timing register 22, is in timed relation with the CPU clock via the SYS CLK signal. In accordance therewith the TRANSPEND signal indicates that a transfer of data is pending and, accordingly, is set whenever the memory module is started and is cleared whenever the data has been successfully transferred to or from the memory module. The WAITING signal is set whenever the memory module is started and another module already has a data transfer pending, in which case the module in question must wait for the other module to transfer its data. The WAITING signal is cleared when the data transfer of the other module has been successfully transferred.

The MBLOAD signal is set when a write command is received from the processor and the memory is in a proper timing state to accept data for a "WRITE" operation into the memory module. This signal stays asserted until the end of the memory timing cycle. The MBLOAD signal is not set except for a "WRITE" condition and in all other conditions it remains unasserted.

The memory status logic of FIG. 7 provides the $\overline{MS0}$, $\overline{MS1}$ and $\overline{BUSY}$ signals. The $\overline{MS0}$ signal informs the processor that the module is busy and the $\overline{MS1}$ signal informs the processor that data is not yet ready for transfer (the memory has not yet reached the point in its timing cycle at which the data is available, e.g., the MT0.MTG3 point in the Gray code timing cycle) and, accordingly, such signals stop the processor operation until the data becomes available. Further, if the memory module is fulfilling a previous request for data transfer it provides a BUSY signal which also asserts the $\overline{MS0}$ signal to indicate the unavailability of the module for data transfer.

The logic 25 of FIG. 8 is substantially conventional when using Gray code timing and is well-known in the art for providing the required $\overline{READ\ 1}$, $\overline{READ\ 2}$, STROBE, $\overline{INHIBIT}$ and $\overline{WRITE}$ signals for X/Y core memory operation.

Figure 11:
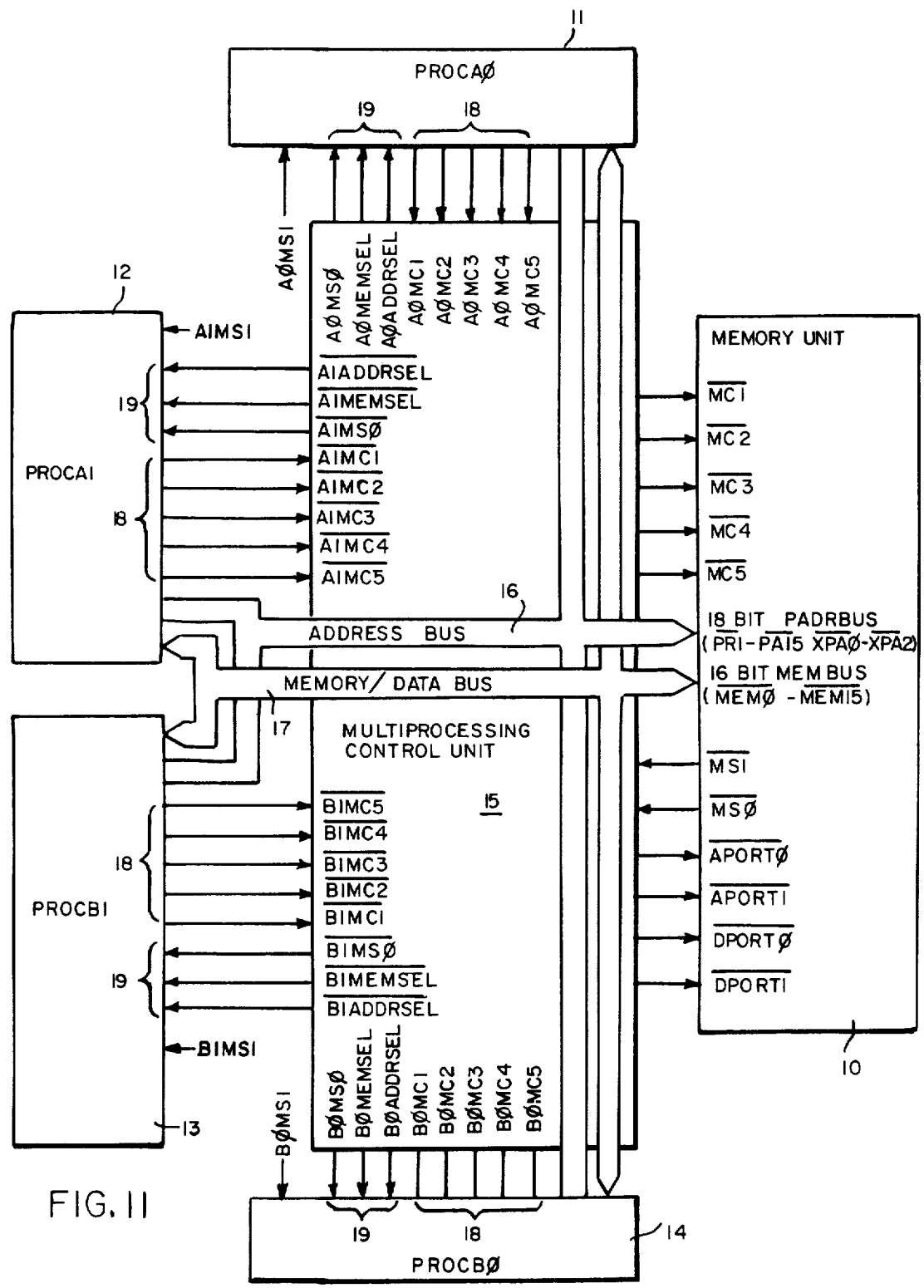
FIG. 11 shows a broad block diagram of the system of the invention utilizing a plurality of processors and a common memory system together with a multiprocessing control unit therefor.

Although the above description has discussed the operation of the invention wherein a single central processor unit is used with the memory system, operation of a plurality of central processor units with a single memory system can also be achieved. Thus, as can be seen in FIG. 11, a single memory system 10, comprising a plurality of separate memory modules as shown and discussed above, is arranged so that it can be accessed by four central processor units 11, 12, 13 and 14, identified as the A0, A1, B0 and B1 processors, respectively. A multiprocessing control (MPC) unit 15 is connected to each of the four processor units and to the memory system so as to provide appropriately time shared control of the use of the latter unit by the processors in accordance with a preselected priority relationship. Each of the central processor units 11-14 has timeshared access to the single address bus 16 and to the single memory/data bus 17, both discussed previously in connection with the single processor operation, so that under control of the multiprocessor control unit appropriate processor address information can be transferred from the processor to the selected memory unit and data can be transferred between such processor and the selected memory module. The interface signals between each CPU 11-14 and the multiprocessor control unit 15 each include five memory control signals 18, identified as $\overline{XMC1}$ through $\overline{XMC5}$ (where "X" identifies a particular one of the A0, A1, B0 or B1 processor units) for conveying information concerning address and data requests from each processor to the MPC unit 15. Three additional interface signals 19 from the MPC unit to each CPU provide information concerning the validation of a processor's requests for access to the address and memory/data buses, the latter signals being identified in FIG. 1 as the $\overline{XADDRSEL}$, $\overline{XMEMSEL}$ and $\overline{XMS0}$ signals (again where "X" identified either the A0, A1, B0 or B1 processor unit).

The interface signals between the multiprocessor control unit and the memory unit include five memory/data request signals from the MPC to the memory, effectively the same signals supplied in a single processor operation and identified here also as signals $\overline{MC1}$ through $\overline{MC5}$ and four port-code signals for uniquely defining the address and data ports of the requesting central processor unit, such signals identified as the $\overline{APORT0}$, $\overline{APORT1}$, $\overline{DPORT0}$ and $\overline{DPORT1}$ signals. Two additional interface control signals are supplied from the memory to the multiprocessor control unit to indicate whether a selected memory module is able to start a memory cycle and whether data from a selected module is ready to be read. Such signals are identified as above with reference to single processor operation as the $\overline{MS0}$ and $\overline{MS1}$ signals, respectively.

For the multiprocessor operation of the system of the invention the memory modules must be able to identify the requesting processor when such processor is either requesting access to or data transfer to or from a particular memory module. Such identification is established by the address port (A-PORT) code signal and a data port (D-PORT) code signal. Each processor is assigned a unique port code. When a memory module is started by a requesting processor, the A-PORT signal (A-PORT0 and A-PORT1) is sent to the memory system together with the address and such A-PORT code is saved by the memory module which is thereby started, as mentioned above. Before any data is transferred to or from the selected memory module for write or read operation, the A-PORT code which was saved must match the identifying D-PORT code (D-PORT0 and D-PORT1) accompanying the data request. Accordingly, the D-PORT code is always identical to the A-PORT code for any one processor.

The specific logic utilized in the multiprocessor control unit 15 is shown and discussed with reference to FIGS. 19 through 28 and, in the description which follows, the central processor units 11-14 are conveniently referred to, as shown in FIG. 11, as processors A0, A1, B0 and B1, respectively.

Figure 12:
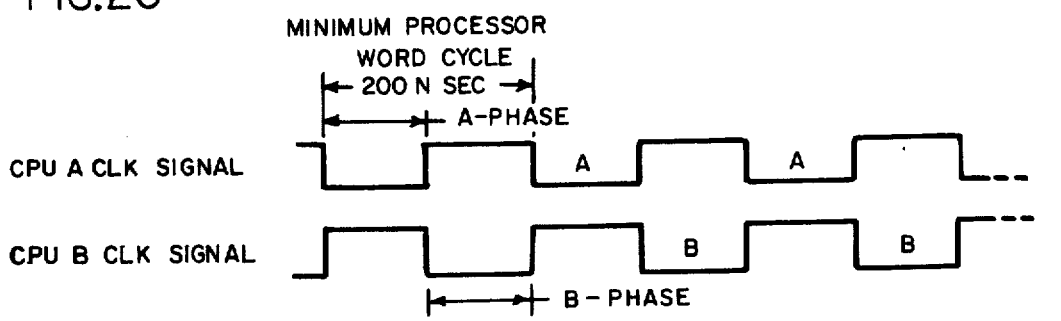
FIG. 12 shows a graphical representation of one embodiment of the time-sharing techniques used for the multiprocessing system of FIG. 11.

Before describing the logic circuitry in detail, the time sharing process and priority control can be described with reference to FIG. 12. As can be seen therein, the minimum processor word cycle can be divided into an integral number of successive time periods, or phases. In one such convenient time relationship as specifically shown in FIG. 12, the minimum processor word cycle is divided into two phases, identified as "A-PHASE" and "B-PHASE," respectively. Thus, in a system utilizing a minimum processor word cycle of 200 nsec., for example, each phase has 100 nsec. duration.

The system using four processors as in FIG. 11 is arranged so that central processors 11 and 12 (A0 and A1) can access the address and memory/data buses only during phase A, while processors 13 and 14 (B0 and B1) can access such buses only during phase B. In a system where only two processors are controlled by the multiprocessor control unit, one can be assigned to the A-Phase with the other assigned to the B-Phase. In such a case, as long as the processors are addressing different memory modules, there can be no degradation in program execution speed. The only problem arises when each processor requires access to the same memory module, in which case a time sharing priority can be arranged.

In the case where a multiprocessor control unit is controlling the operation of four central processor units with a single memory unit, no conflict in address or memory data bus access can occur so long as the processors operating in any one phase do not require access to the same bus simultaneously and so long as a processor operating in the A-Phase does not require access to the same memory module as a processor operating in the B-Phase.

Accordingly, in a four processor system, if either of the A-Phase processors requires access to the same memory module as either of the B-Phase processors, as appropriate inter-phase control must be arranged to provide appropriate priority of operation therebetween. Further, if a processor operating in a particular time phase requires access either to the address bus or to the memory bus simultaneously with the other processor operating in the same time phase, an intra-phase priority control must also be arranged.

The intra-phase control is discussed initially below with reference to the A-Phase and the principles of such priority control are equally applicable to the B-Phase.

Since both processors A0 and A1 share the same phase, one processor can be arbitrarily assigned a higher priority than the other. Thus, for example, A0 may be assigned the higher priority, so that when the A0 processor requests access to a memory module it is provided such access as fast as possible, and any current processing that is being performed by the A1 processor is suspended and processor A0 is allowed to proceed with minimum time latency. In order to understand how the control of such priorities within each phase is accomplished, consideration can be given to FIG. 11 and to the timing diagrams of FIGS. 13 through 16. As seen in FIG. 11, a processor is provided access to the address bus if, and only if, its unique address select signal (e.g., the A0ADDRSEL signal or the A1ADDRSEL signal) is asserted. Further, any processor is provided access to the memory bus if, and only if, its memory select signal (i.e., the A0MEMSEL or the A1MEMSEL signal) is asserted.

In this connection and with reference to FIG. 11 the interface signals between the multiprocessor control unit and each processor are particularly described below with reference to the A0 processor, it being clear that the analogous signals perform the same functions with respect to each of the other processors.

Thus, the assertion of the A0MC1 signal by processor A0 indicates that such processor wishes to request a memory cycle. When it receives an A0ADDRSEL signal from the multiprocessor control unit to indicate the availability of the address bus, the A0 processor places an 18-bit address on the address bus 16 for addressing a specific memory module identified thereby. The A0MC1 signal is held asserted so long as the A0MS0 signal is asserted.

An assertion by the A0 processor of the A0MC2 signal indicates that processor A0 wishes to inhibit its current memory cycle request and, accordingly, such signal can only be asserted when the A0MC1 signal has been asserted. Upon the assertion of A0MC2 the memory system will appropriately disregard the memory cycle request signal from the A0 processor. The A0MC2 signal is held asserted so long as the A0MS0 signal is asserted.

The A0ADDRSEL signal is asserted by the multiprocessor control unit 15 to indicate to the requesting A0 processor that it has access to the address bus. Such indication enables the requesting processor to gate the appropriate 18-bit address on to the physical address bus 16.

The assertion of the A0MEMSEL signal by the multiprocessor control unit indicates to the requesting processor A0 that it has access to the memory/data bus for a READ or WRITE data transfer. For a WRITE operation, such indication enables the requesting processor to gate the 16-bit WRITE information on to the memory/data bus.

The A0MS0 signal is asserted by the multiprocessor control unit 15 during the A-Phase only when an address or a data transfer by the A0 processor is in process and during all B-Phases. When such signal is asserted during the A-Phase it indicates that the address or data transfer requested by the A0 processor is unable to occur. Accordingly, the requesting processor must hold all of its control lines quiescent while the A0MS0 line is asserted.

In connection with the intra-phase priority control operation, e.g., as between the A0 and A1 processors, various operating cases can be considered to explain the desired operation of the multiprocessor controller to achieve the appropriate priorties. Since the A0 processor is arbitrarily given the highest priority, the system is arranged so that the A1 processor has continuous access to the memory unit during the A-Phase only so long as the A0 processor is not requesting a memory cycle. Four operating cases can be considered to assist in understanding such a priority arrangement, such cases being exemplary of typical situations where priority allocations are required.

CASE 1

Figure 13:
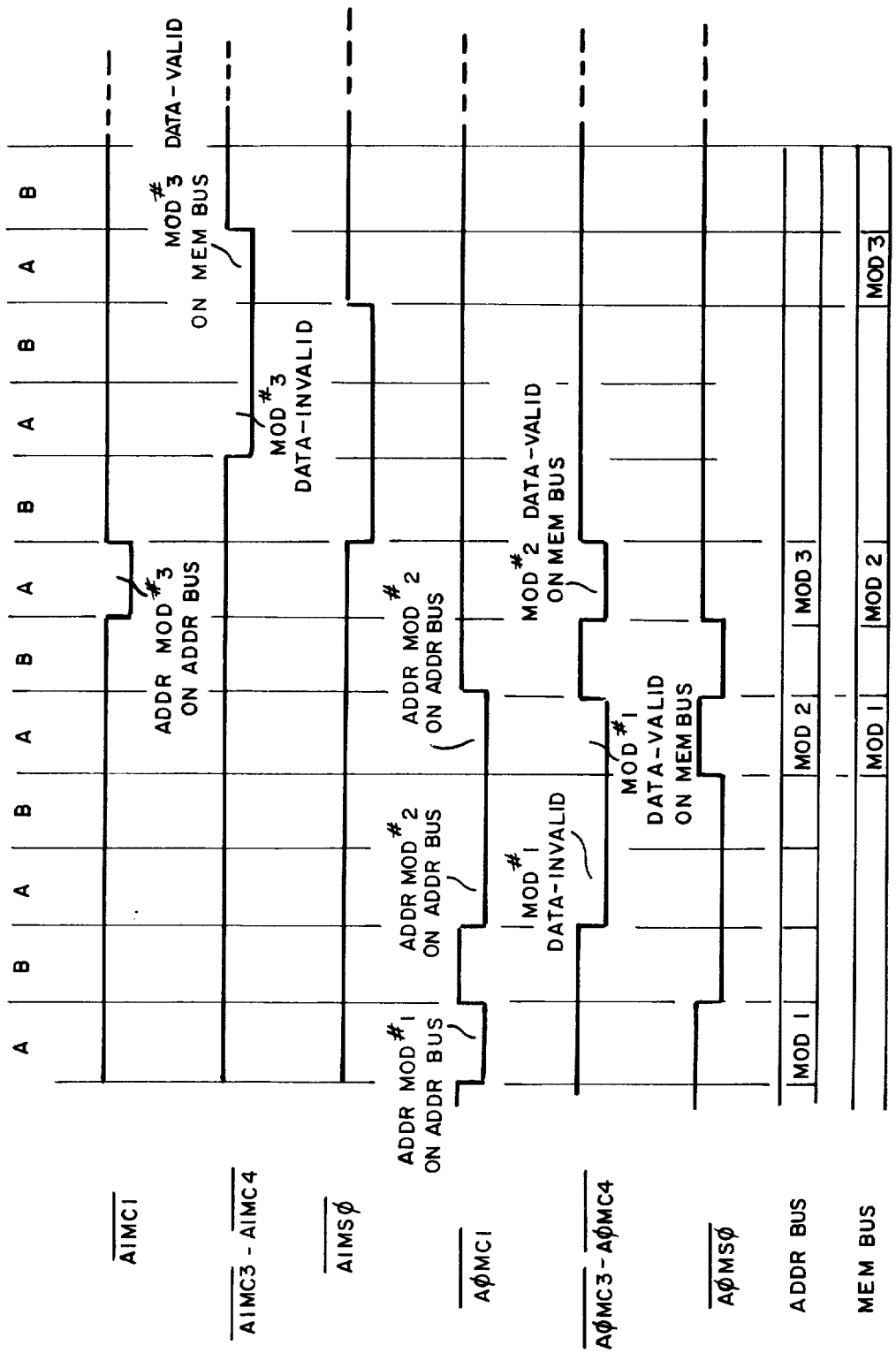
FIG. 13 shows a graphical representation of certain exemplary signals of the system of FIG. 11 to demonstrate a particular operating case thereof.

In this case it can be assumed that the A0 processor wishes successive access to two different memory modules and that, during the transfer of data with respect to the second module, the A1 processor calls for access to still another memory module. The appropriate signals for explaining such operation are shown in FIG. 13 and, as can be seen therein, during the initial A-Phase time period the A0MC1 signal calls for access by the A0 processor to the address bus which, since such bus is not being accessed by the A1 processor, is accessed by the A0 processor (the A0ADDRSEL signal is asserted by the multiprocessor control unit). The address of the first selected memory module (identified as MOD 1) is placed on the address bus. During the next A-Phase, the A0 processor calls for access to a second module (MOD 2) and receives an A0ADDRSEL signal to indicate that the address bus is available, whereupon the MOD 2 address is placed thereon. Simultaneously, the A0MC3 and A0MC4 signals are asserted in accordance with a code signifying that a data transfer operation is requested with respect to data in the first selected memory module, e.g., a READ or WRITE operation. If the data is not yet ready for transfer (e.g., if the speed of the memory operating cycle is such that data cannot be accessed within a single instruction word cycle) the data is not available for transfer, i.e., a "not valid" situation, during the current A-Phase and it cannot be placed on the memory/data bus. During the second A-Phase time period the A0MS0 signal is asserted to signify that the A0 processor must wait until the next A-Phase because the microinstruction word cannot be completely implemented. Thus, in this instance, the microinstruction word requests the placement of the MOD 2 address on the address bus and transfer of the MOD 1 date on the memory bus. Since the latter cannot take place, the $\overline{\text{A0MS0}}$ signal is asserted here and the microinstruction word is held until the next A-Phase. It should be noted that, as long as the A0 or A1 processor has a transfer pending, the MPC automatically asserts the $\overline{\text{A0MS0}}$ or $\overline{\text{A1MS0}}$ signal, respectively, during the B-Phase.

During the next A-Phase the $\overline{\text{A0MEMSEL}}$ signal is asserted high by the controller to indicate that the data from MOD 1 is available for transfer and the data is thereupon transferred from such memory module to the A0 processor on the memory/data bus and the MOD 2 address is placed on the address bus. The $\overline{\text{A0MS0}}$ signal is asserted high during such address and data transfer. During the succeeding A-Phase, the A1 processor calls for access to a third module (identified as MOD 3) while the A0 processor is simultaneously calling for access to the memory/data bus to provide for a data transfer from MOD 2. The $\overline{\text{A0MEMSEL}}$ signal from the multiprocessor control unit is inserted to indicate that the memory/data bus is available for the appropriate data transfer from MOD 2 while the $\overline{\text{A1ADDRSEL}}$ signal is simultaneously asserted to indicate the availability to the A1 processor of the address bus for placing the address of the selected memory of MOD 3 thereon by the A1 processor. In both cases the $\overline{\text{A0MS0}}$ and $\overline{\text{A1MS0}}$ signals are not asserted to permit the respective data and address information transfers to take place on the appropriate buses.

During the next succeeding A-Phase, the A0 processor has completed its memory module data transfers so that the memory/data bus becomes available to the A1 processor for transferring data with reference to the selected MOD 3. At that point, however, the data is not valid and such cannot be placed on the memory/data bus until the $\overline{\text{A1MS0}}$ signal is asserted low to hold the microinstruction word until the following A-Phase time period when the data is validated and ready for transfer. At such time the $\overline{\text{A1MEMSEL}}$ signal is again asserted and the data from MOD 3 is transferred to the A1 processor on the memory/data bus as desired (the A1MS0 signal is appropriately asserted high).

CASE 2

Figure 14:
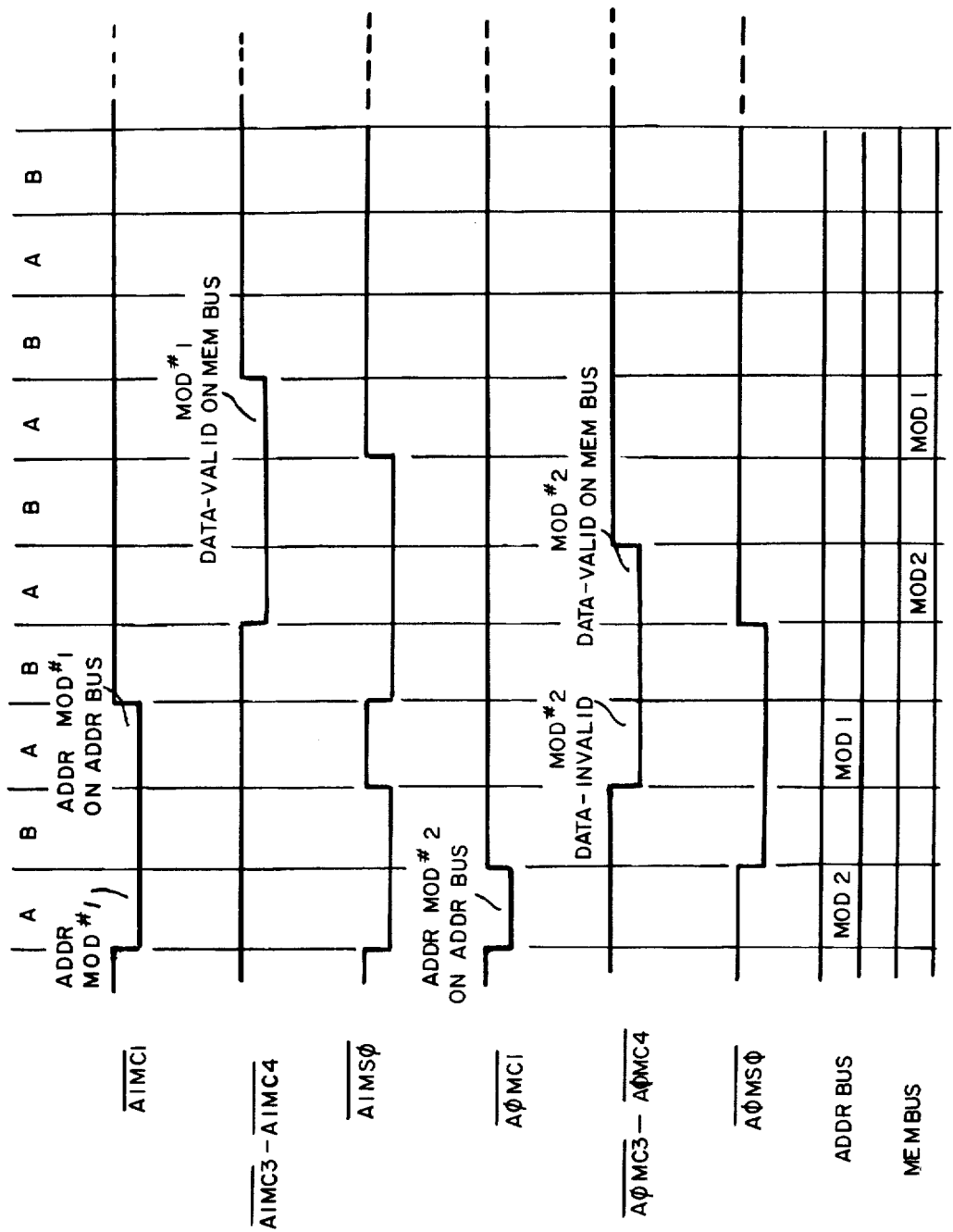
FIG. 14 shows a graphical representation of certain exemplary signals of the system of FIG. 11 to demonstrate another particular operating case thereof.

In this case the A0 and A1 processors call simultaneously for access to different memory modules. Under the assumed priority control the A0 processor is permitted to access its memory module first because of its high assigned priority and is allowed to complete its data transfer before the A1 processor can access its selected memory module. FIG. 14 shows the appropriate signals involved in a manner analogous to that discussed with reference to FIG. 13 and, as can be seen, the address for the selected module called for by the A1 process is not placed on the address bus until the A-Phase time period following that A-Phase period in which the address of the memory module called for by the A0 processor has been placed thereon. The address of the module selected by the A1 processor can be placed on the address bus at the same time the data transfer to the memory/data bus is called for by the A0 processor, even though the actual A0 data transfer does not occur until the following A-Phase cycle. The transfer of data from the selected module of the A1 processor cannot take place until the A0 processor's data is fully completed at which time the respective $\overline{\text{A1MS0}}$ and $\overline{\text{A0MS0}}$ signals are not asserted as shown.

CASE 3

Figure 15:
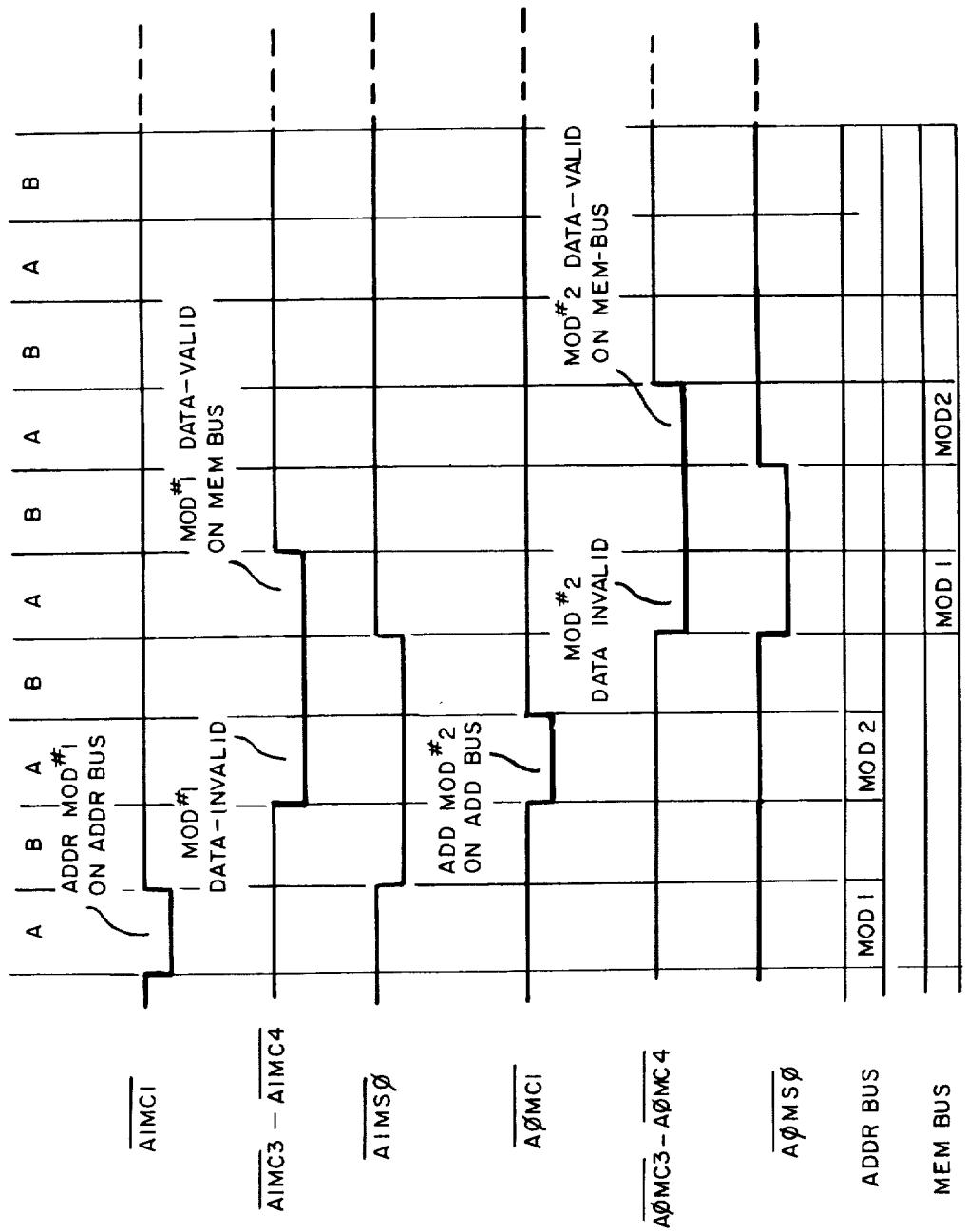
FIG. 15 shows another graphical representation of certain exemplary signals of the system of FIG. 11.

In this case the A0 processor calls for access to a selected memory module while the A1 processor is in the process of transferring data from a previously selected memory module. Under such conditions as shown in FIG. 15, while the A0 processor can access its selected module the A0 processor cannot transfer data with respect thereto until the data transfer with respect to the module selected by the A1 processor is completed. Thus, even though the latter data may not be ready for such transfer at the time the A0 processor requests access to its selected module, the A1 module is permitted to complete the data transfer during the succeeding A-Phase time period before the data transfer for the module selected by the A0 processor is permitted to be made in order to prevent a memory system lock-up even though the A0 processor has the high priority. As can be seen in the next case discussed below, if the A0 processor wishes to retain access to the address and data buses for subsequent memory selection and data transfer operations, the A1 processor must wait until all of the data transfers for the A0 processor have been completed.

CASE 4

Figure 16:
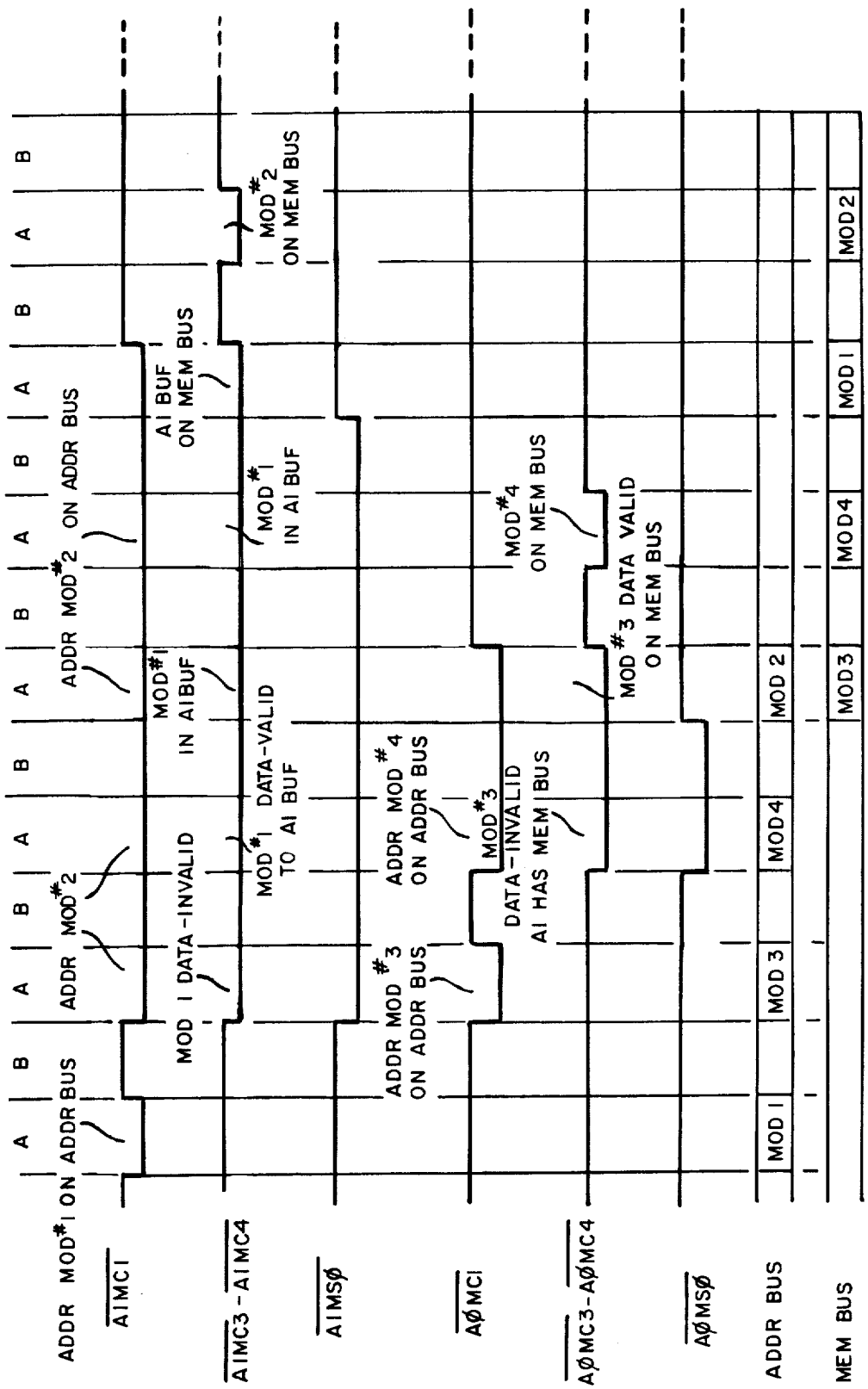
FIG. 16 shows still another graphical representation of certain exemplary signals of the system of FIG. 11.

In this case both the A1 processor and the A0 processor each call for access to two successive memory modules, the A1 processor for example, beginning its calls for access prior to those of the A0 processor. As can be seen in FIG. 16 the A1 processor addresses its first selected module (e.g., MOD 1), and, while it is calling for a data transfer in the next A-Phase time period, the A0 processor calls for access to its selected module (e.g., MOD 3). Since the A0 processor has a higher priority than the A1 processor it receives priority control for its access to the address bus during the second A-Phase time period so that the call for memory access (e.g., for MOD 2) by the A1 processor is prevented and the selected address for MOD 3 is placed on the address bus by the A0 processor. During the next A-phase cycle, the A1 processor instruction word calls for a data transfer with respect to MOD 1 and an address transfer for selected MOD 2. However, since the A0 processor has priority control of the address bus for subsequent addressing of its selected memory module (e.g., MOD 4) the A1 processor instruction word cannot be fully implemented. However, in order to avoid loss of the data that has been accessed by the A1 processor with reference to its selected MOD 1, the data therein is placed in a buffer register located in the multiprocessor control unit (identified in FIG. 16 as the A1BUF) so that during succeeding phase cycles, such data remains available in the A1BUF until it can be transferred on to the memory/data bus. Placement of the A1 data also allows MOD 1 to rewrite its data and, thus, become available for access by another processor (e.g., the A0 processor). When the address bus becomes available, the address of MOD 2, selected by the A1 processor, can be placed on the address bus. Meanwhile, the A0 processor is able to transfer the MOD 3 data on the memory/data bus. Since the A0 processor retains its access to the memory/data bus, the data stored in the A1BUF must be held therein until the memory/data bus becomes available. It is not until the A0 data transfer with reference to MOD 4, selected by the A0 processor, is completed that the data from the A1BUF can be transferred on to the memory bus. The data transfer with reference to MOD 2, as selected by the A1 processor, can then subsequently be transferred in the next succeeding A-Phase cycle as shown in FIG. 16. In each of the above operations the appropriate $\overline{\text{A0MS0}}$ and $\overline{\text{A1MS0}}$ signals are asserted low when the microinstruction word cannot be implemented and asserted high when such word can be carried out.

The above exemplary cases in which appropriate priorities are arranged between A0 and A1 processor operation (or analogously between B0 and B1 processor operation) deal essentially with intraphase priorities. Although the multiprocessor control unit 15 can thereby efficiently allocate the desired priorities to resolve processor conflicts within each phase, a problem arises when an A-Phase processor wishes to access the same memory module currently being used by a B-Phase processor. If an appropriate interphase priority allocation is not arranged, a high priority processor, e.g., the A0 processor, may be prevented from obtaining access to such memory module until a lower priority B-Phase processor, e.g., the B1 processor, has finished accessing such module, a time period which, under some conditions, could be extensive. Without such priority allocation the high priority A0 processor may have an excessive operational latency time (i.e., the time it must wait in order to obtain access to a selected memory module).

An effective inter-phase priority allocation can be arranged in accordance with the following coding scheme with reference to the memory address ports (designated as the A-Port 0 and A-Port 1).

| A-Port 0 | A-Port 1 | Priority |
|---|---|---|
| 0 | 0 | Designates the processor having the highest priority (e.g., the A0 processor) which is provided with a minimum latency period in accessing a selected memory module by such processor. |
| 0 | 1 | Designates the processor having the next highest priority (e.g., the B0 processor) which is provided with a minimum latency time only so long as the highest priority processor is not requesting access to the same memory. |
| 1 | 0 | Designates a processor of one phase having a shared low priority (e.g., the A1 processor) which is provided with a minimum latency time only so long as no other processor (i.e., either the A0, B0 or B1 processors) is requesting access to the same memory module. |
| 1 | 1 | Designates a processor of the other phase having shared low priority (e.g., the B1 processor) which is provided with a minimum latency time only so long as no other processor (i.e., either A0, B0 or A1) is requesting access to the same memory module. |

As can be seen from the above table, the low priority A1 and B1 processors are given effectively equal priority allocation so that if a memory module is currently "busy" on the A1 processor port and a request is pending from the B1 processor port, the memory module automatically switches to the B1 processor port on the next B-Phase, following the completion of the memory cycle, assuming no higher priority requests from either the A0 or the B0 processors are present. In accordance with the operation of the above priority logic the port code of the processor port that initially starts the memory module is appropriately stored. If, at any time during the time the module is "busy" and such port code is stored, the memory module receives a request from a still higher priority port, the previously stored port code is replaced by the higher priority code. When such high priority port code is saved via such a storage operation, a "priority switch pending" flip-flop (providing a "PSP" signal) is set in the memory module so that it automatically switches to the stored high priority port during the next memory cycle, even if such operation requires a switching of the operating phase. If another request is made from an even higher priority code, then the priority port code which was previously saved is discarded and the new, higher priority port code is saved. When the memory module is in a "not busy" state it will then only accept a request from the priority port which has been saved or a higher priority code which has displaced it.

As an illustration, if a memory module has been selected and, therefore, has been set "busy" by the B1 processor port, for example, and a request is issued by the A1 processor, the latter request is rejected since the memory module is currently "busy". The A1 processor port code, however, is saved and the priority switch pending flip-flop is set so that at the next memory cycle the A1 processor is given access to the memory module as desired. When the memory module becomes "not busy" during the B-Phase it will reject any new request from the B1 processor and in the next A-Phase it will accept the request from the A1 processor port.

The priority flow could have been redirected in the above two cases under the following conditions. First of all, when the module selected by the B1 processor became "not busy" and a request was present from the B0 processor, the module would have accepted the request from B0. Since the B0 processor is at a higher priority than the B1 processor, the memory processor controller would have allowed the B0 processor to proceed to complete its data transfers on the B-Phase.

When the module selected by the B1 processor became "not busy" and switched to the A-Phase, a request for access to the same module was present from the A0 processor port, the A1 processor port request would have been held off by the multiprocessor control unit and the A0 processor request allowed to proceed.

Two further exemplary cases in which the above interphase priority allocations can be illustrated are discussed with reference to the two situations depicted in FIGS. 17 and 18.

CASE 5

Figure 17:
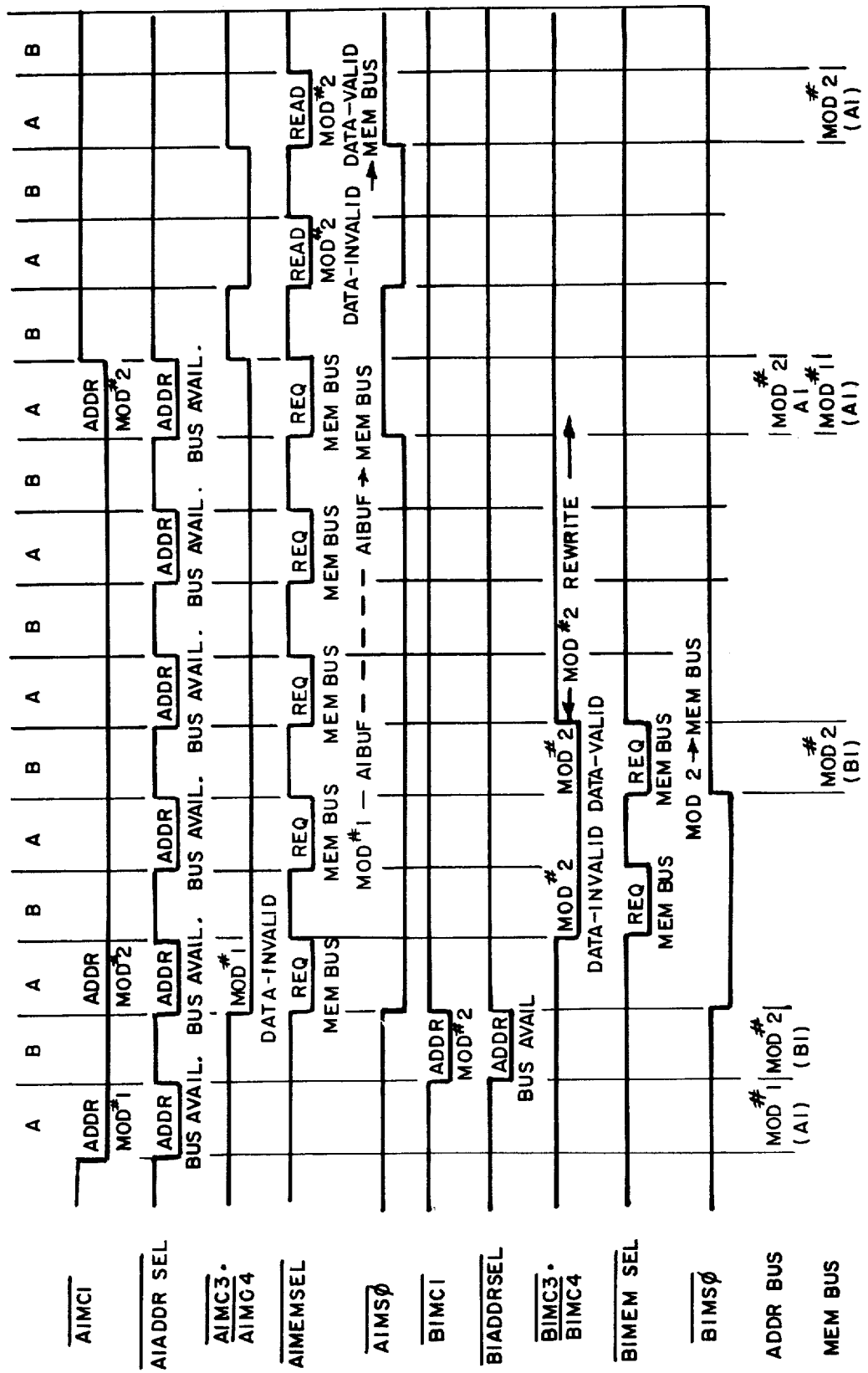
FIG. 17 shows still another graphical representation of certain exemplary signals of the system of FIG. 11.

In this case depicted in FIG. 17, the A1 processor, for example, calls for access to and data transfers with respect to two different modules (e.g., MOD 1 and MOD 2). The B1 processor then calls for access to and starts, the latter module (MOD 2) before th A1 processor has obtained its access thereto. As seen therein, the A1 instruction word requiring the addressing of MOD 2 and the transfer of MOD 1 data cannot be implemented because MOD 2 is "busy" due to the addressing thereof and data transfer by the B1 processor. Accordingly, the data from MOD 1 is transferred to the A1 buffer register (i.e., as designated by the $\overline{\text{A1BUF}}$ signal) for temporary storage, while the B1 processor completes its MOD 2 data transfer and its automatic rewrite operation. After the latter data transfer, the A1 processor can then address MOD 2 and simultaneously transfer the MOD 1 data from the $\overline{\text{A1BUF}}$ to the memory bus. Subsequently it can transfer the MOD 2 data on the memory bus, as shown.

CASE 6

Figure 18:
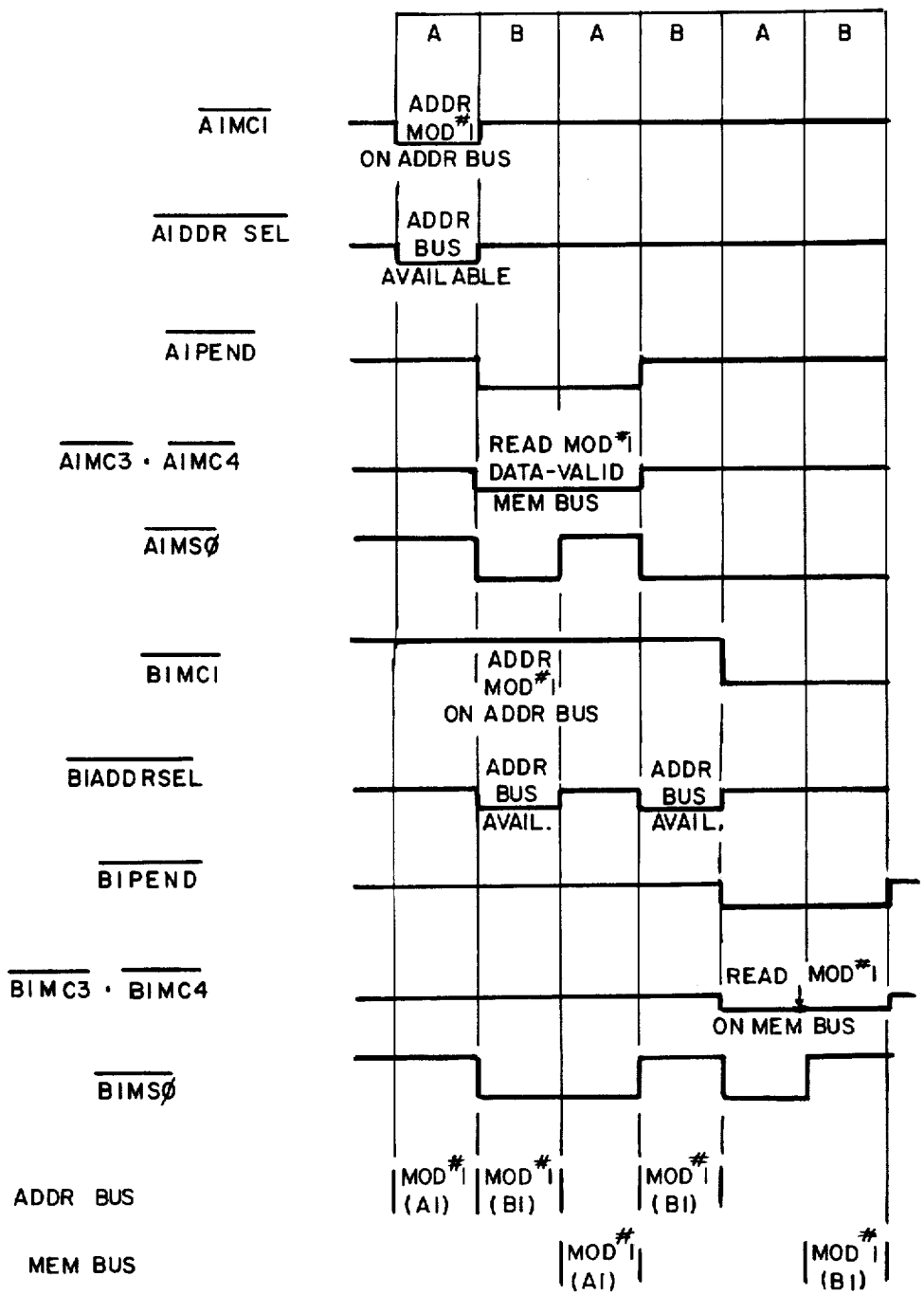
FIG. 18 shows still another graphical representation of certain exemplary signals of the system of FIG. 11.

The case depicted in FIG. 18 illustrates the use of the above interphase priority allocations in a situation in which a high-speed memory is used (e.g., wherein the memory operating cycle is equal to the minimum instruction word cycle) and in which both the A1 and B1 processors request access to the same memory module, the A1 processor requesting such module prior to the B1 processor. In such case the MOD 1 data transfer with respect to the A1 processor must be completed before the B1 processor data transfer can be made, as shown.

The specific implementation of one embodiment of the overall multiprocessor and memory logic required to provide the above priority allocations with respect to a system using four processor units and a memory system having a plurality of memory modules is shown in FIGS. 2–10 and 19–28. FIGS. 19–28 show the logic and control circuits utilized in the multiprocessing control unit 15 which circuits provide the required interface signals between the multiprocessor unit and the four processors and memory unit as well as the internal control signals needed in unit 15, while the previously discussed FIGS. 2–10 show a memory module of the memory system 10 and the logic and control circuits for controlling the operation of such a module and for producing the desired processor/memory interface signals, as well as the internal control signals needed in the module.

Figure 19:
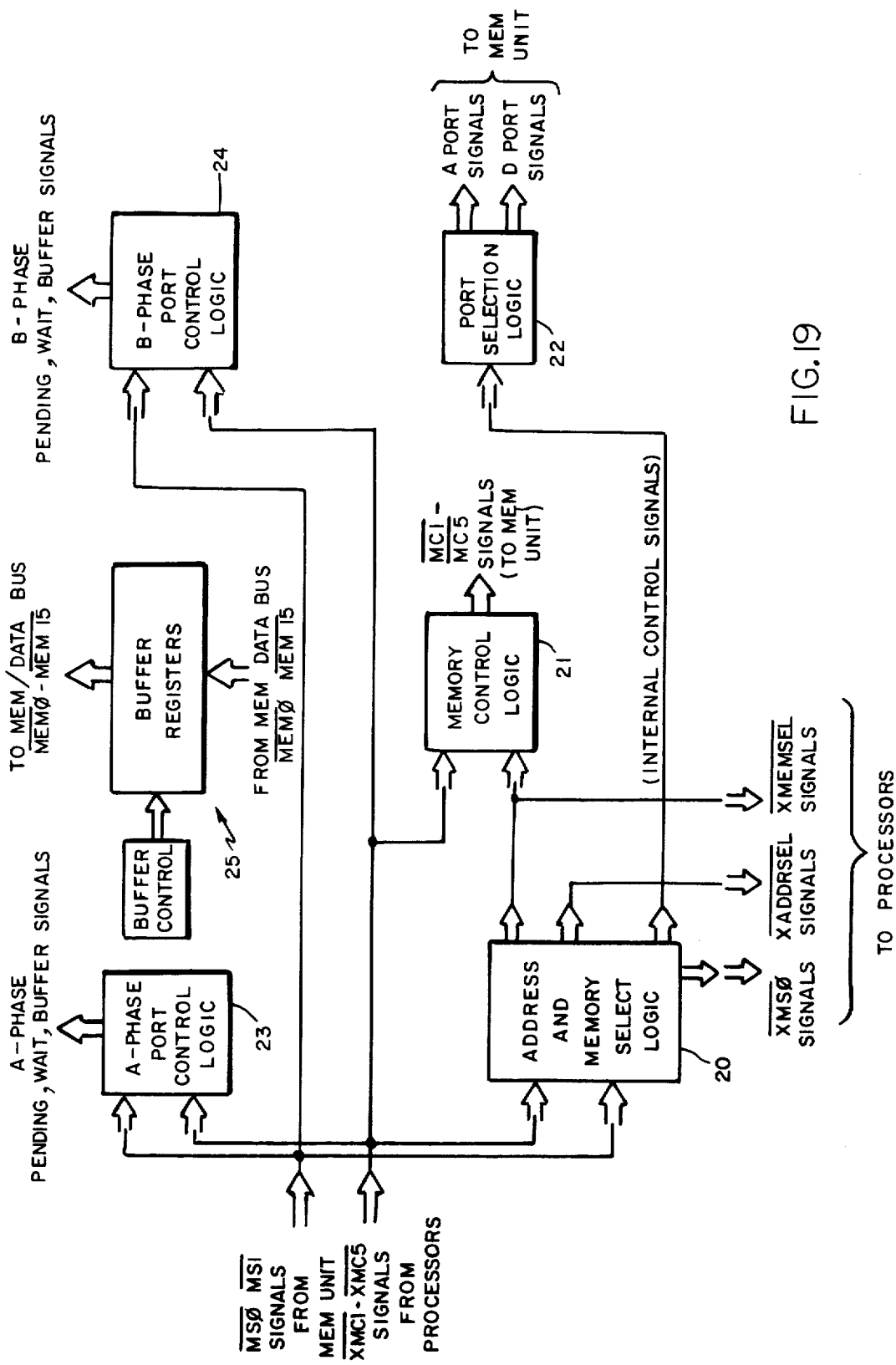
FIG. 19 shows a block diagram of an embodiment of the multiprocessing control unit of the system of FIG. 11.

FIG. 19 depicts in broad block diagram form the arrangement of the multiprocessing unit 15 wherein various logic circuitry is utilized to accept interface signals from the processors and memory unit and to produce the desired control signals for transfer to the processors and memory unit. Thus the address and memory select logic 20 generates the $\overline{\text{XADDRSEL}}$, $\overline{\text{XMEMSEL}}$, and $\overline{\text{XMS0}}$ signals for each of the processors (where "X" corresponds to one of the processors A0, A1, B0 and B1) as determined by the $\overline{\text{MS0}}$ and $\overline{\text{MS1}}$ signals from the memory unit, together with the $\overline{\text{XMC1}}$ through $\overline{\text{XMC5}}$ signals from each of the processors. A specific exemplary configuration for the address and memory select logic 20 is shown and discussed with reference to FIGS. 20 and 21.

Memory control logic 21 utilizes the $\overline{\text{XMEMSEL}}$ signals from the address and memory select logic 20, together with the $\overline{\text{XMC1}}$ through $\overline{\text{XMC5}}$ signals from the processors to provide the appropriate control signals MC1 through MC5 for the memory unit. A specific exemplary configuration for such logic is depicted in more detail in FIG. 22. The port selection logic 22 utilizes appropriately generated internal control signals from the address and memory select logic 20 in order to produce the A PORT and D PORT signals for the memory unit. A specific exemplary configuration for such logic is depicted in more detail in FIGS. 23 and 24. The A-Phase port control logic 23 and the B-Phase port control logic 24 utilize the $\overline{\text{MS0}}$ and $\overline{\text{MS1}}$ control signals from the memory unit and the $\overline{\text{XMC1}}$ through $\overline{\text{XMC5}}$ signals from the processors, as shown, in order to control the operation of the A-Phase and B-Phase ports which are supplied with appropriate control signals to indicate the "pending," "wait," and "buffer" status of such ports. A specific exemplary configuration for such logic is depicted and discussed in more detail with reference to FIGS. 25 and 26. The buffer registers and buffer control logic 25 are depicted in more detail in FIGS. 27 and 28.

Figure 20:
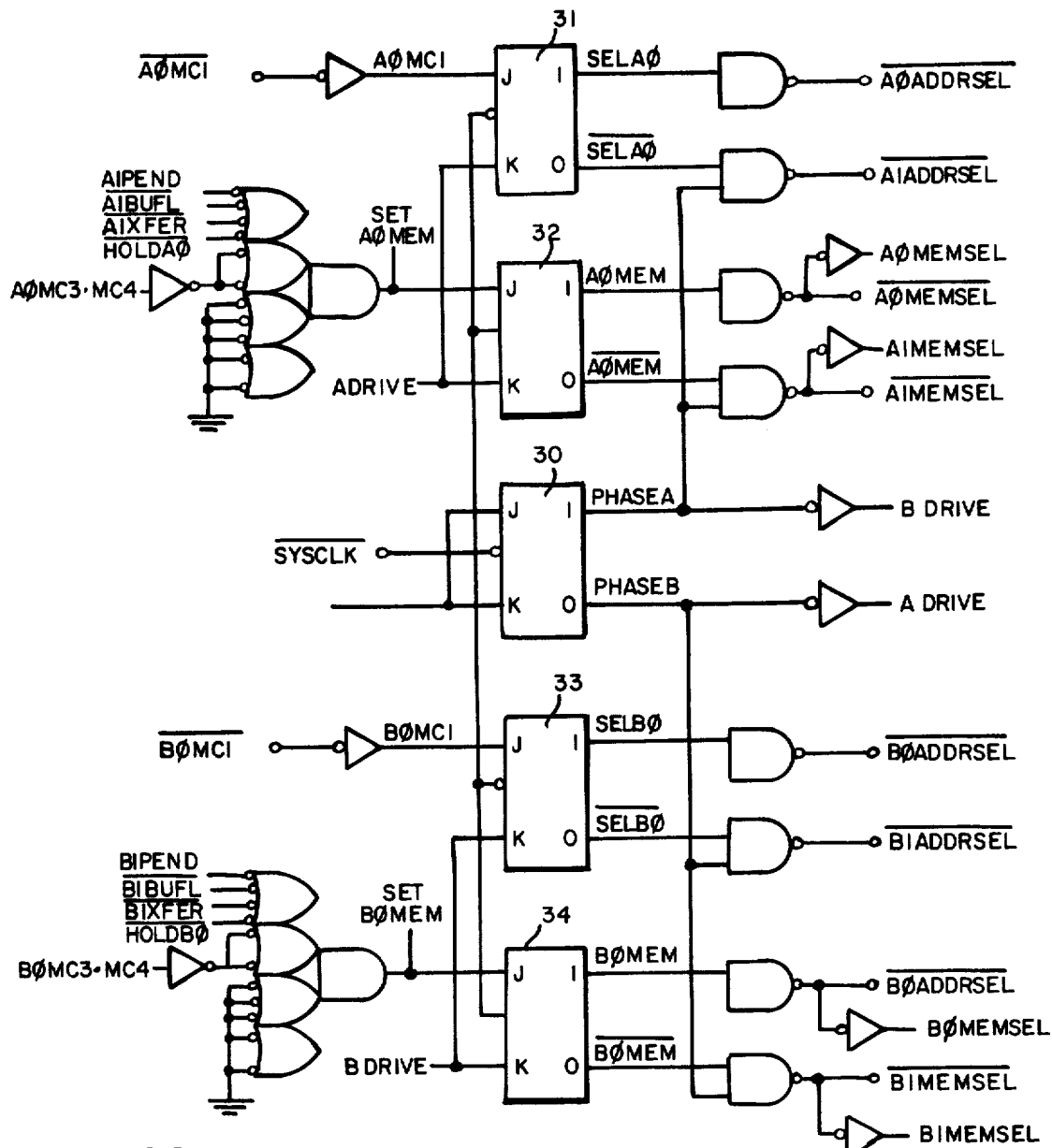
FIG. 20 shows part of the logic circuitry used in the multiprocessing control unit of FIG. 19.

As can be seen in the address and memory select logic of FIG. 20, a plurality of "JK" flip-flops 31–34 are used to determine which of the four processors is selected for access to the address bus or access to a memory module for data transfer thereto or therefrom during either the A-Phase or the B-Phase. The presence of an A-Phase or a B-Phase is defined by a system clock signal, which arises in a processor unit, and is fed to a "JK" flip-flop 30 to provide the appropriate PHASE A and PHASE B clock signals at the output terminals thereof. The waveforms for such clock signals are shown in FIG. 12. Flip-flops 31 and 32 provide the apropriate address select signals and memory select signals for the A0 and A1 processors, while the flip-flops 33 and 34 provide the address select and memory select signals for the B0 and B1 processors. In accordance with the logic shown in FIG. 20 for the A0 and A1 processors, for example, the $\overline{\text{A1ADDRSEL}}$ signal is provided for transfer to the A1 processor so long as the A0 processor is not requesting access to the address bus through the assertion of its $\overline{\text{A0MC1}}$ signal. In the latter case an A0 select signal (SELA0) is appropriately generated to produce an $\overline{\text{A0ADDRSEL}}$ signal indicating access to the address bus has been given to the A0 processor.

Similarly, access to the memory/data bus is provided to the A1 processor as signified by the generation of the $\overline{\text{A1MEMSEL}}$ signal, unless the A0 processor is requesting access to the same memory module and is provided priority access thereto. Such priority access can be provided only so long as the A1 processor has not already been given prior access to the memory/data bus (signified by the presence of the $\overline{\text{A1PEND}}$ signal), or so long as the A1 processor is not loading its selected data into the A1 buffer register (signified by the $\overline{\text{A1BUFL}}$ signal), or so long as the A1 processor is not completing an actual data transfer (signified by $\overline{\text{A1XFER}}$ signal), or so long as there is no signal requesting a hold for the A0 processor operation (signified by $\overline{\text{HOLDA0}}$ signal).

Similar operation with respect to address and memory selections occurs with reference to the B0 and B1 processors as shown with reference to "JK" flip-flops 33 and 34.

Figure 21:
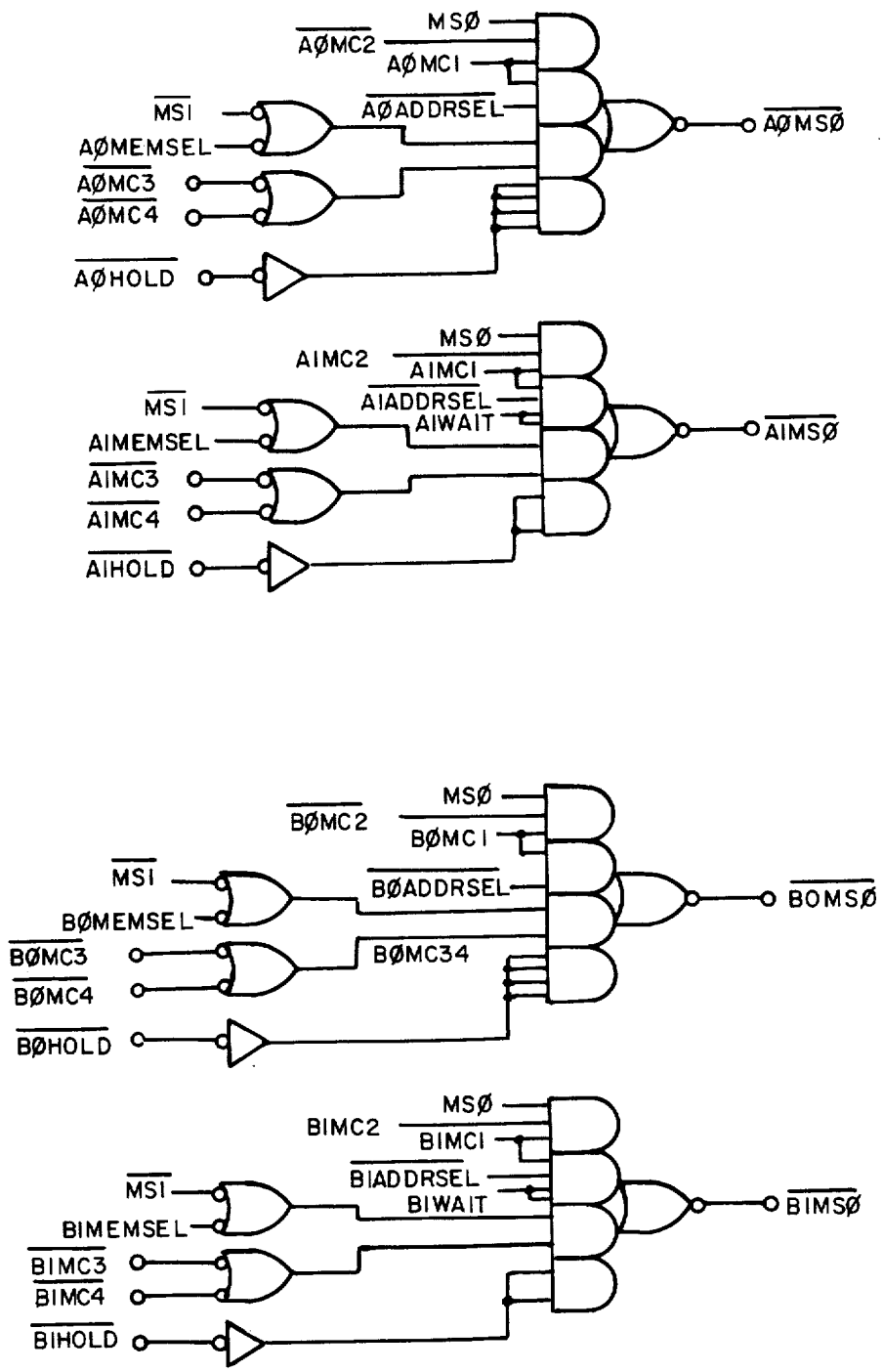
FIG. 21 shows another part of the logic circuitry of FIG. 19.

The remainder of the address and memory select logic 20 is shown in FIG. 21 wherein the $\overline{\text{XMS0}}$ signals are generated for feeding back to the processors. As seen therein, the address select and memory select signals shown in FIG. 20, together with the memory select signals ($\overline{\text{MS0}}$ and $\overline{\text{MS1}}$) from the memory unit and the memory control signals $\overline{\text{XMC1}}$ through $\overline{\text{XMC4}}$ are combined to produce the $\overline{\text{XMS0}}$ signals which, when asserted, indicate which processor is holding the address and/or memory bus in a "busy" state.

Figure 22:
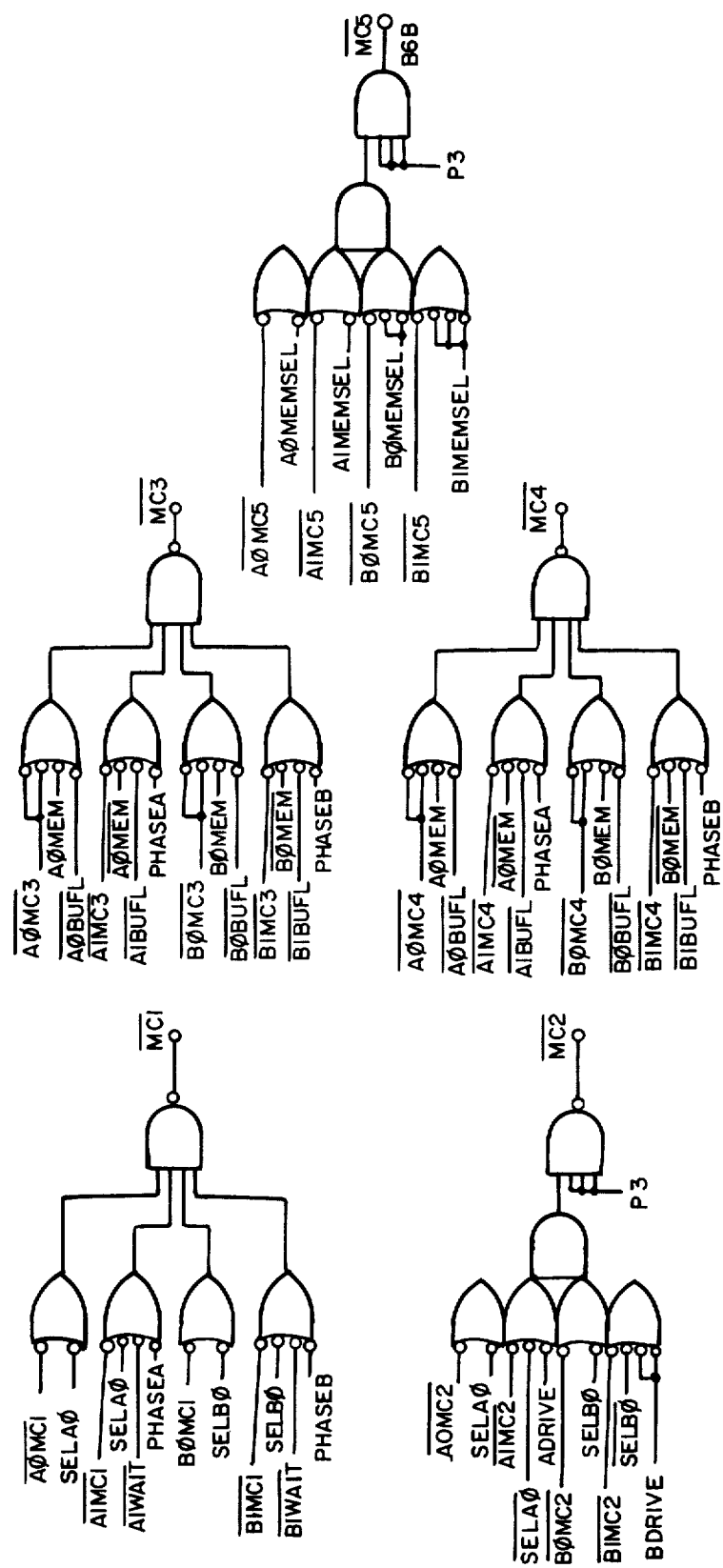
FIG. 22 shows still another part of the logic circuitry of FIG. 19.

Logic for producing the memory control $\overline{\text{MC1}}$ through $\overline{\text{MC5}}$ signals which are supplied to the memory unit by the memory control logic 21 is shown in FIG. 22. As seen therein, the appropriate memory control signals ($\overline{\text{XMC1}}$ through $\overline{\text{XMC5}}$) are supplied from the processors together with the internally generated address select ($\overline{\text{SELX}}$) signals, the memory select ($\overline{\text{XMEM}}$) signals, the A and B phase drive signals from the address and memory select logic 20, and the buffer load signals ($\overline{\text{XBUFL}}$), the states of all of such signals thereby producing the appropriate memory control signals which, as discussed above, either initiate the start of particular selected memory modules, prevent the start thereof, initiate a data transfer thereto or therefrom, or inhibit such data transfer.

Figure 23:
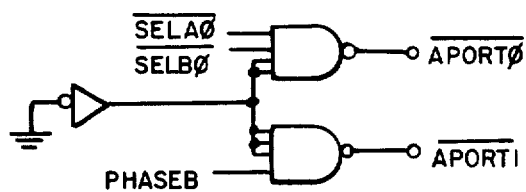
FIG. 23 shows still another part of the logic circuitry of FIG. 19.
Figure 24:
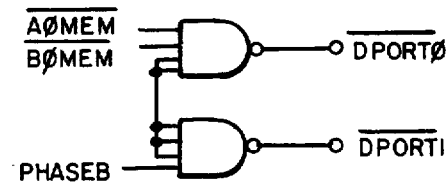
FIG. 24 shows still another part of the logic circuitry of FIG. 19.

FIGS. 23 and 24 depict the logic for providing the A PORT and D PORT signals which are fed from the multiprocessing control unit to the memory unit. As can be seen therein, the appropriate internally generated address and memory select signals ($\overline{SELX}$ and $\overline{XMEM}$) with reference to each processor, together with the "Phase B" signal produces the desired port code signals which uniquely define the address and data ports of the requesting processor, as required.

Figure 25:
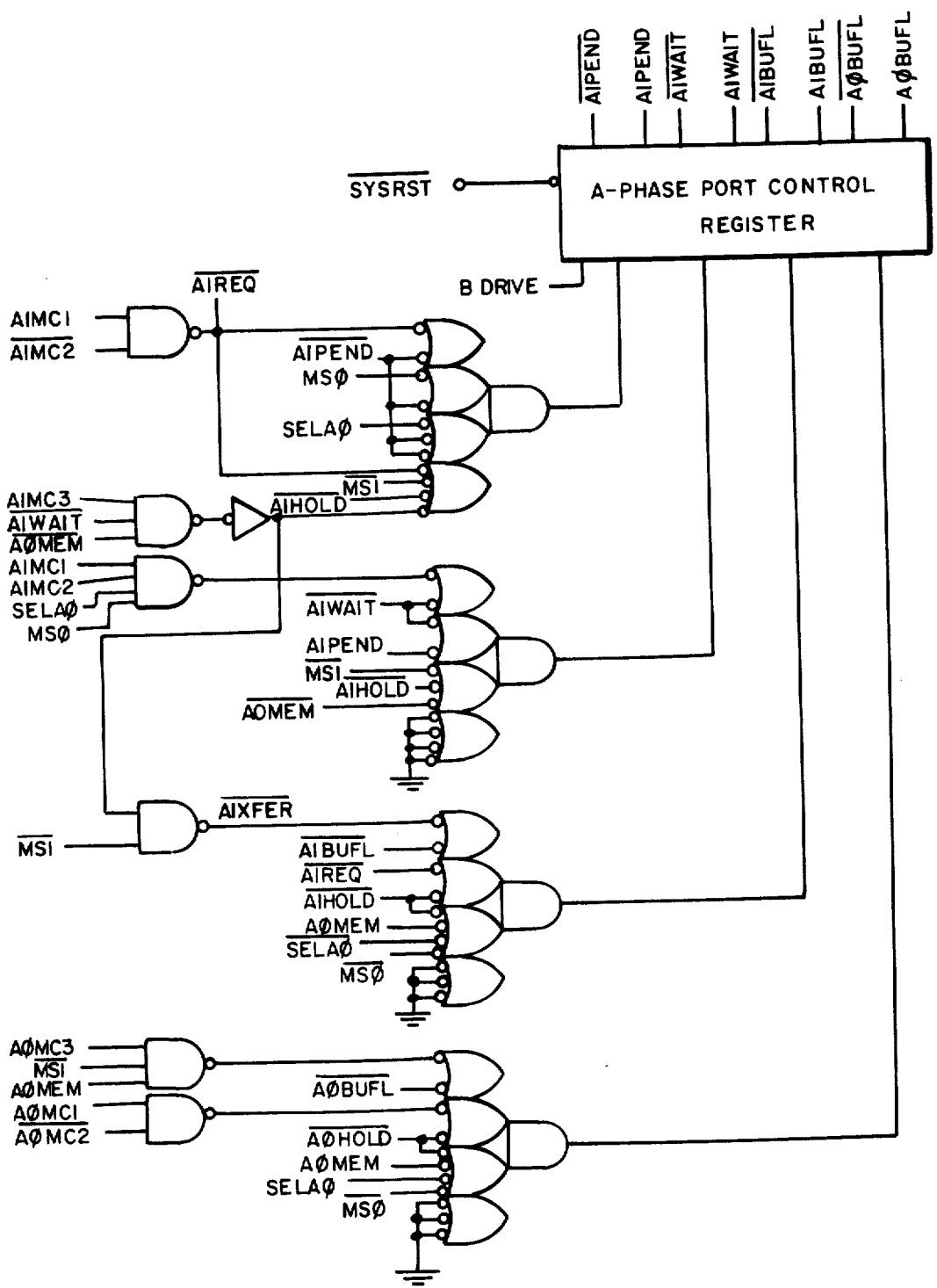
FIG. 25 shows still another part of the logic circuitry of FIG. 19.
Figure 26:
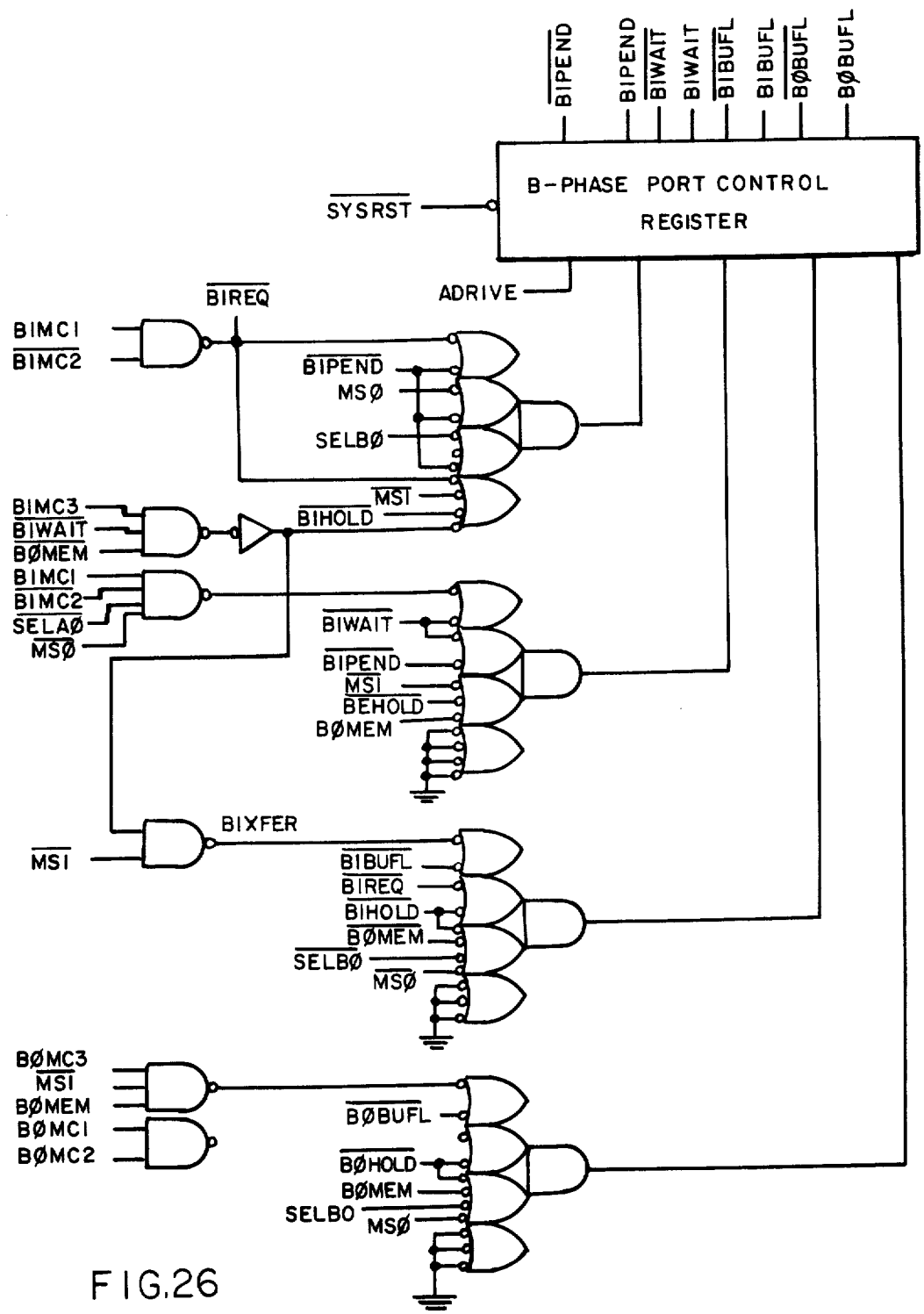
FIG. 26 shows still another part of the logic circuitry of FIG. 19.

FIGS. 25 and 26 depict the logic for controlling access to the A-Phase and B-Phase ports, which logic generates appropriate signals for indicating when the A1 (or B1) processors are utilizing such ports, either by holding them for a subsequent data transfer (e.g., an A1PEND state), by holding them for an actual data transfer (an A1WAIT state), or by holding them for a transfer to the buffer register for temporary storage of data (A1BUFL and A0BUFL states). For such operation the relationship among the memory control signals from the processors, the memory status signals from the memory unit, and the various internally generated status signals concerning the pending, wait and holding states as well as the address and memory select signals are required as shown.

Figure 27:
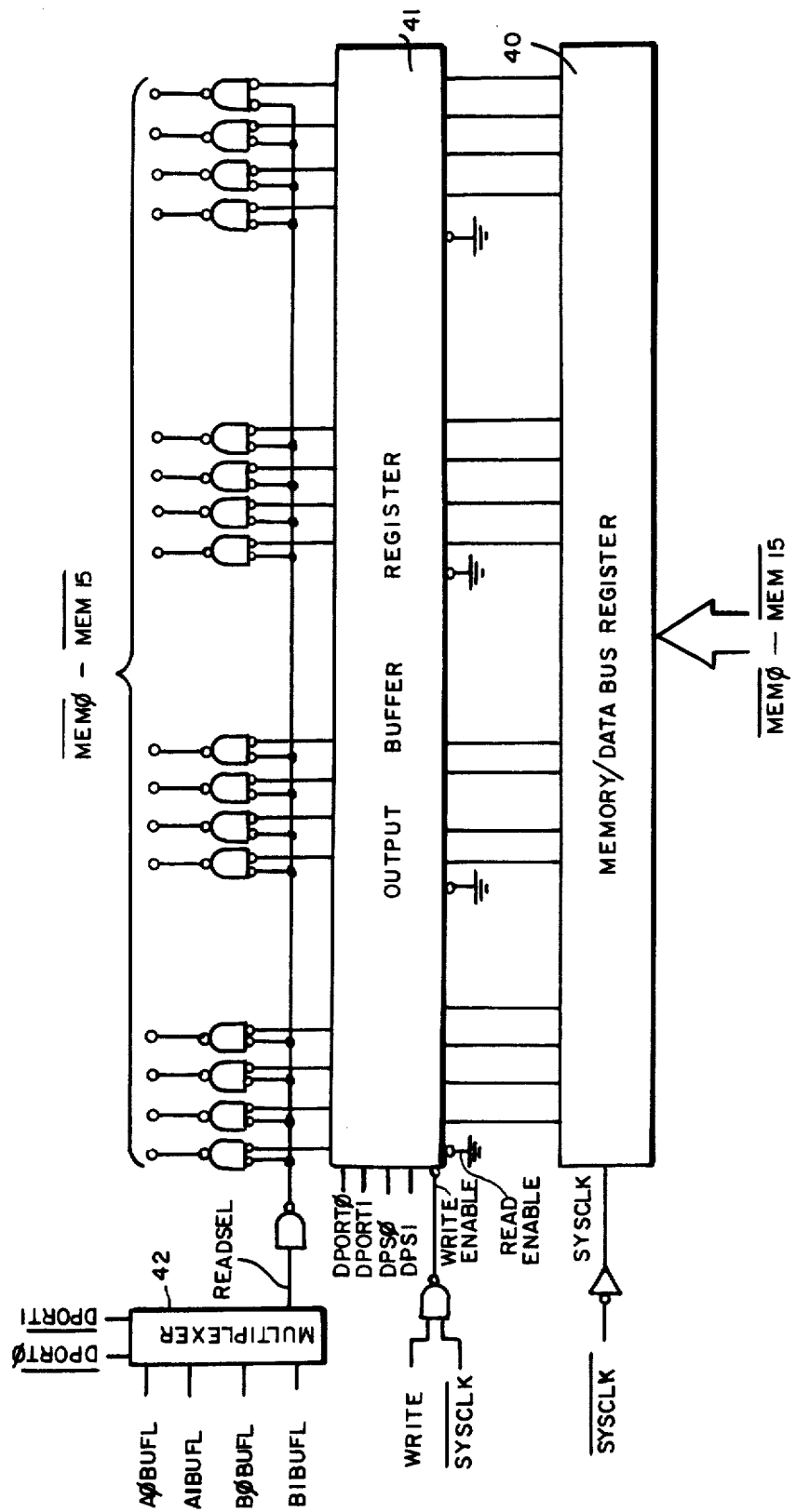
FIG. 27 shows still another part of the logic circuitry of FIG. 19.

FIG. 27 shows the multiprocessor control unit buffer register system and the control arrangement thereof which includes a first memory/data bus buffer register 40 which is a single 16-bit register and has stored therein whatever data is on the memory/data bus delayed by one-half of the minimum instruction word cycle (e.g., a 100 nsec. delay for the 200 cycle discussed above). The data in the buffer register 40 is thereupon clocked into the output buffer register 41 which, in effect, comprises four 16-bit registers, one associated with each processor, the data from buffer register 40 being clocked into the appropriate register of the output buffer in accordance with the XBUFL signals at multiplexer 42. The data is held in the appropriate output buffer register until the processor for which it is intended can accept it, at which point the READSEL is asserted so as to place the desired data on to the memory/data bus for transfer to the appropriate processor as identified by the data port code signals DPORT0 and DPORT1. Thus, the buffer system permits data on the memory/data bus to be continually monitored in the buffer register 40 and to be temporarily stored in the output buffer register 41 until the processor for which it is intended to be transferred is ready to accept it.

Figure 28:
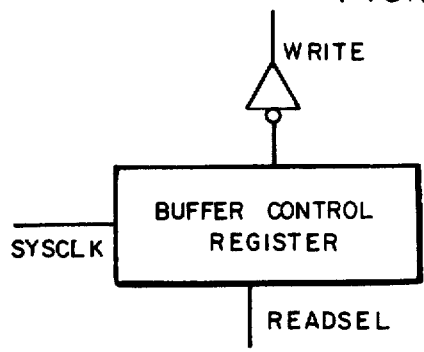
FIG. 28 shows still another part of the logic circuitry of FIG. 19.

With respect to the operation of the buffer control register of FIG. 28, the register is arranged so that the presence of a READSEL signal (for placing data from buffer register 41 on to the bus for acceptance by a processor) prevents the assertion of a WRITE signal so that such data will not be written back into the buffer register system. As soon as the processor accepts the data, the READSEL signal is no longer asserted and the WRITE signal is appropriately asserted by the buffer control register so that whatever is in the bus register 40 is written into the buffer register 41.

What is claimed is:

1. In a data processing system, which includes a memory system comprising at leat one memory module for use with at least one data accessing control unit, each said at least one memory module having timing means for generating timing signals to control the operating time cycly thereof, said at least one data accessing control unit including means for providing a first memory control signal for requesting the initiation of an operating time cycle of said at least one memory module and means for providing a second memory control signal for preventing the initiation of an operating time cycle of said at least one memory module which has been so requested, said data accessing control unit further including means for providing an address signal, said at least one memory module comprising means responsive to said first memory control signal and to an address signal from a data accessing control unit for producing a memory address select signal when an address in said memory module has been selected for access by said data accessing control unit;

means for generating a busy signal when said memory module is currently in an operating state;

means connected to said memory module timing means and responsive to said address select signal, and to the states of said busy signal and said second memory control signal at each memory operating time cycle for starting the operation of the timing means of said at least one memory module to initiate an operating time cycle thereof in order to access said selected address when the state of said busy signal indicates that said memory module is currently not in operation and when the state of said second memory control signal indicates that the initiation of said operating time cycle of said memory module is not to be prevented.

2. A memory module in accordance with claim 1 wherein said data processing system further includes a data bus for transferring data between said at least one data accessing control unit and said memory system and further wherein said at least one data accessing control unit includes means capable of providing third and fourth memory control signals for requesting the selection of one of a plurality of data transfer operations for said memory module, said memory module further comprising memory buffer means for storing data during a data transfer operation;

means responsive to said third memory control signal for transferring data from said buffer means into a memory element of said memory module;

means responsive to said fourth memory control signal for transferring data from said buffer means to said data bus;

means responsive to the combination of said third and fourth memory control signals for transferring data from a selected memory element of said memory module to said memory buffer means and for transferring said data from said buffer means to said selected memory element.

* * * * *